(12) United States Patent
Sefcik et al.

(10) Patent No.: US 10,890,234 B2
(45) Date of Patent: Jan. 12, 2021

(54) MULTI SPEED TRANSMISSION

(71) Applicants: Linamar Corporation, Guelph (CA); Michael C Sefcik, Linden, MI (US); Joe Dear, Canton, MI (US); Ray Coger, Monroe, MI (US)

(72) Inventors: Michael C Sefcik, Linden, MI (US); Joe Dear, Canton, MI (US); Ray Coger, Monroe, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 16/337,436

(22) PCT Filed: Sep. 29, 2017

(86) PCT No.: PCT/US2017/054353
§ 371 (c)(1),
(2) Date: Mar. 28, 2019

(87) PCT Pub. No.: WO2018/064505
PCT Pub. Date: Apr. 5, 2018

(65) Prior Publication Data
US 2020/0032882 A1    Jan. 30, 2020

Related U.S. Application Data

(60) Provisional application No. 62/402,411, filed on Sep. 30, 2016.

(51) Int. Cl.
| | | |
|---|---|---|
| *F16H 3/66* | (2006.01) | |
| *F16H 48/10* | (2012.01) | |
| *F16H 48/11* | (2012.01) | |

(52) U.S. Cl.
CPC ............. *F16H 3/663* (2013.01); *F16H 48/11* (2013.01); *F16H 2048/106* (2013.01);
(Continued)

(58) Field of Classification Search
CPC ......... F16H 2048/102; F16H 2048/104; F16H 2200/0034; F16H 2200/2035;
(Continued)

(56) References Cited

U.S. PATENT DOCUMENTS

2017/0204942 A1* 7/2017 Iuchi ..................... B61C 9/00
2018/0015818 A1* 1/2018 Mehlis .................. F16D 47/02

FOREIGN PATENT DOCUMENTS

| DE | 102014205553 | 10/2015 | |
| DE | 102016202723 A1 * | 8/2017 | ............ F16H 3/006 |
| JP | H03149439 | 6/1991 | |

* cited by examiner

*Primary Examiner* — Timothy Hannon
(74) *Attorney, Agent, or Firm* — Miller Canfield

(57) ABSTRACT

A family of two speed transmissions has a plurality of members that can be utilized in drive trains to provide varying gear ratios. The transmission family members include step pinion planetary gear sets. In one embodiment, there is a single step pinion planetary gear set with two sun gears configured selectively as the transmission input, two ring gears, one of which is rigidly attached to ground and the other is configured to act as the transmission output. In another embodiment, there is removed one of the ring gears and there is added a planetary reduction gear set comprised of a sun gear, a ring gear rigidly attached to ground and a planetary carrier configured to act as the transmission output. In another embodiment, there is provided a transmission comprising a plurality of helical gear sets and a planetary gear set for speed reduction.

8 Claims, 21 Drawing Sheets

(52) U.S. Cl.
CPC ............... *F16H 2200/0034* (2013.01); *F16H 2200/2007* (2013.01); *F16H 2200/2035* (2013.01); *F16H 2200/2097* (2013.01)

(58) Field of Classification Search
CPC ..... F16H 2200/2097; F16H 2200/2007; F16H 2200/201
See application file for complete search history.

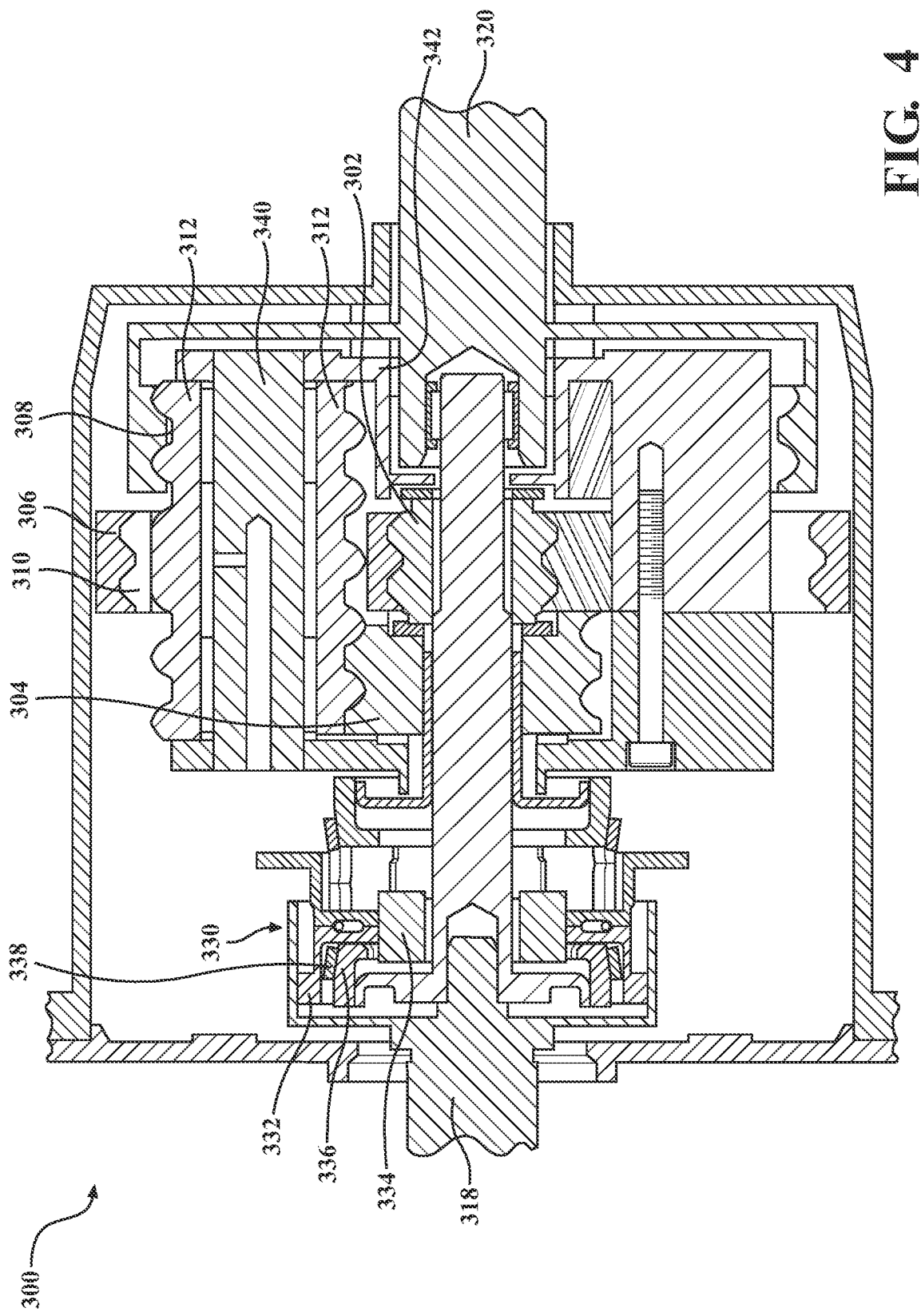

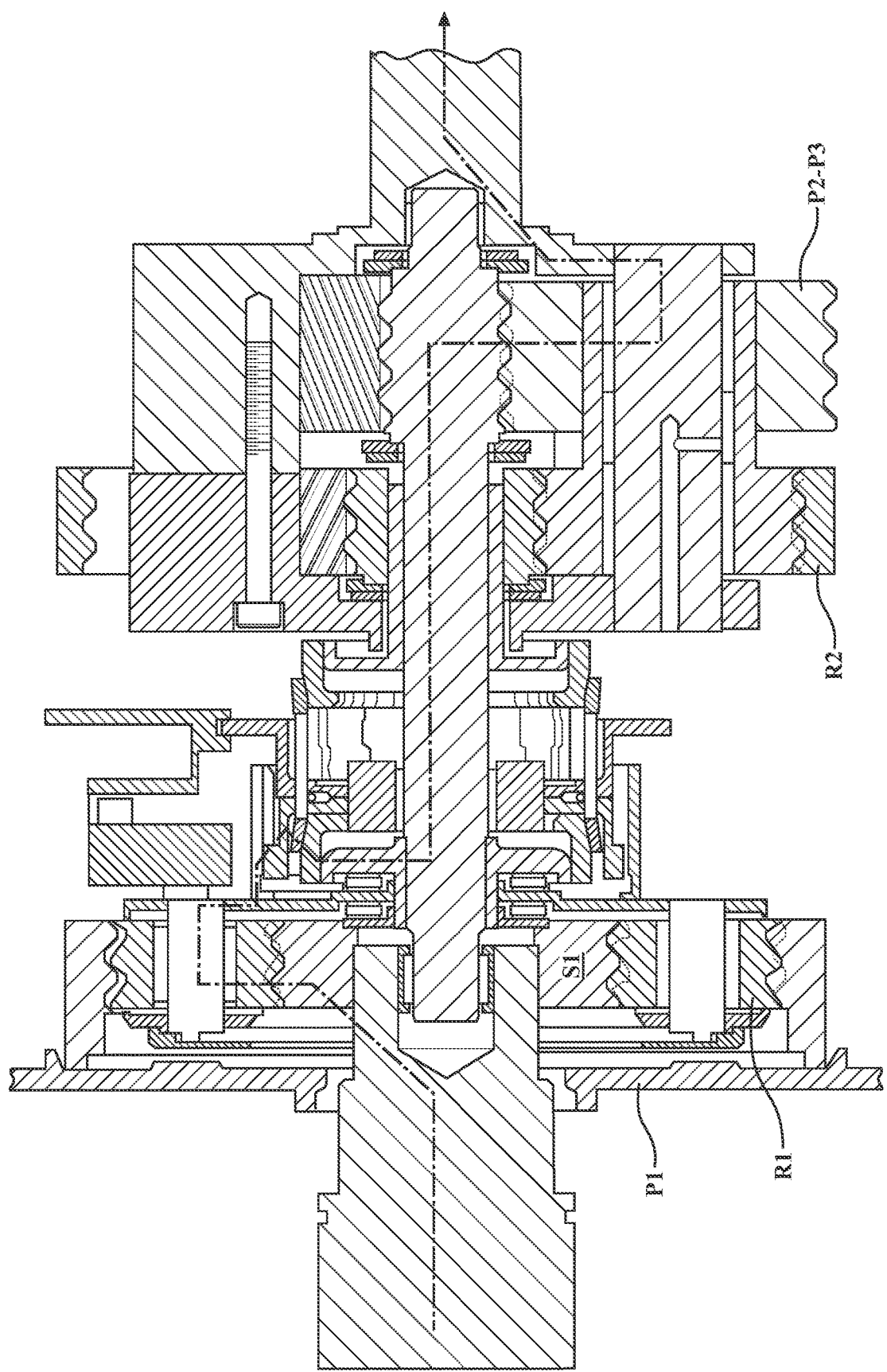

MULTI SPEED TRANSMISSION

CROSS-REFERENCE TO RELATED APPLICATIONS

This application claims priority based on U.S. provisional application No. 62/402,411 filed on Sep. 30, 2016, which is herein incorporated by reference.

BACKGROUND OF THE INVENTION

1. Field of the Invention

The present invention relates to the field of gear box assemblies incorporating multi speed transmissions. More specifically, the present invention relates to gearboxes incorporating multi speed transmissions having standard planetary or step pinion planetary gear sets.

2. Background

Two speed transmissions for electric commercial vehicles are becoming increasingly common and generally require selection between high range for standard travelling speeds and low range, in which typically vehicle speed is reduced while the engine speed remains the same thus increasing torque to the wheels. Such transmissions are also generally integrated along with other components within gearbox assemblies. It is often an object depending on the application to produce transmissions and resulting gearbox assemblies that are axially or radially compact as a transmission with minimal diameter and a small axial cross section is necessary to meet vehicle requirements. It is also an object to ensure that a sufficiently large ratio can be realized. Such transmissions may be created by a combination of gear assemblies that include one or more step pinion planetary gear sets, planetary gear sets or wheel gear sets.

A typical step pinion gear set has a single sun gear with a planetary carrier output. A gear assembly comprising a single step pinion planetary gear set may provide sufficiently large ratios, though these ratios may not be large enough. Adding an additional sun gear to a typical step pinion planetary gear set can provide a second ratio, but may still not achieve the necessary ratios.

SUMMARY OF THE INVENTION

In one broad aspect, the transmission includes a multi speed transmission comprising a transmission input and a transmission output. The transmission also includes a primary reduction gear set comprising a first sun gear configured as the transmission input, a first ring gear rigidly attached to ground, a first planetary carrier with a plurality of interconnected pinion gears meshing with the first sun gear and first ring gear. The transmission also includes a gear assembly having a step pinion planetary gear set having second and third sun gears, a second ring gear rigidly attached to ground, a second planetary carrier configured as the transmission output with a plurality of interconnected pinions meshing with the second and third sun gears and second ring gear, and first and second input clutches driveably connected to the transmission input. The first sun gear configured as the transmission input and the second planetary carrier configured as the transmission output are spaced mutually along the same longitudinal axis In some embodiments, the transmission further includes a synchronizing clutch assembly operably connected to the first and second input clutches and configured to transfer power from the first input clutch to the second input clutch by means of an engagement hub operably connected to the first and second input clutch.

In some embodiments, the transmission is configured to selectively shift between a high gear ratio of about 14:1 and a low gear ratio of about 4.66:1 by the clutch assembly selectively engaging with an engagement ring of one of the second or third sun gears.

In some embodiments, the primary reduction gear set is disposed wholly to the side of the synchronizing clutch assembly closer to the transmission input In another broad aspect the multi speed transmission comprises a transmission input, a transmission output, a gear system comprising a single step pinion planetary gear set having a first or second sun gear configured as the transmission input, a first ring gear rigidly attached to ground, a second ring gear configured as the transmission output, a carrier with a plurality of interconnected pinions meshing with the first and second sun gears and first and second ring gears, first and second input clutches driveably connected to the transmission input; and the first sun or second gear configured as the transmission input, and the second ring gear configured as the transmission output are spaced mutually along the same longitudinal axis.

In some embodiments, the transmission further includes comprising a synchronizing clutch assembly operably connected to the first and second input clutches and configured to transfer power from the first input clutch to the second input clutch by means of an engagement hub operably connected to the first and second input clutch.

In some embodiments, the transmissions disclosed are operable between a neutral state wherein the transmission input is uncoupled from the transmission output and an active state wherein the transmission input is operatively coupled to the transmission output.

In another broad aspect, there is disclosed a gearbox assembly for a vehicle comprising at least one multi speed transmission, an electric drive motor operatively coupled to the transmission to drive power through the gearbox assembly, a gear shift mechanism operatively coupled to the at least one transmissions and configured to selectively shift between a high gear ratio and a low gear ratio by selectively engaging with at least one gear associated with the at least one multi speed transmission, and an inverter for powering the drive motor.

In some embodiments, the transmission of the gearbox assembly comprises an input shaft, first and second gear sets associated with the input shaft, each gear set comprising at least one high range pinion gear and one high range wheel gear, at least one low range pinion gear and one low range wheel gear, a planetary gear set having a planetary sun gear, a planetary ring gear, and a planetary carrier with a plurality of planetary pinion gears meshing with the sun gear and ring gear, and a synchronizer operably coupled to the gear shift mechanism and configured to selectively shift between a high gear ratio and a low gear ratio by engaging one of the high range pinion gear or the low range pinion gear. The pinion and wheel gears are spaced mutually along parallel longitudinal axes One or more of the transmissions and gearboxes may be integrated into a vehicle.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 4 is a cross sectional view of the transmission of FIG. 3 in a low range position;

FIG. 9A is cross sectional view of the transmission of FIG. 8A in low range position showing transmission power flow;

Similar reference numerals may have been used in different figures to denote similar components.

DETAILED DESCRIPTION

Figure 1:
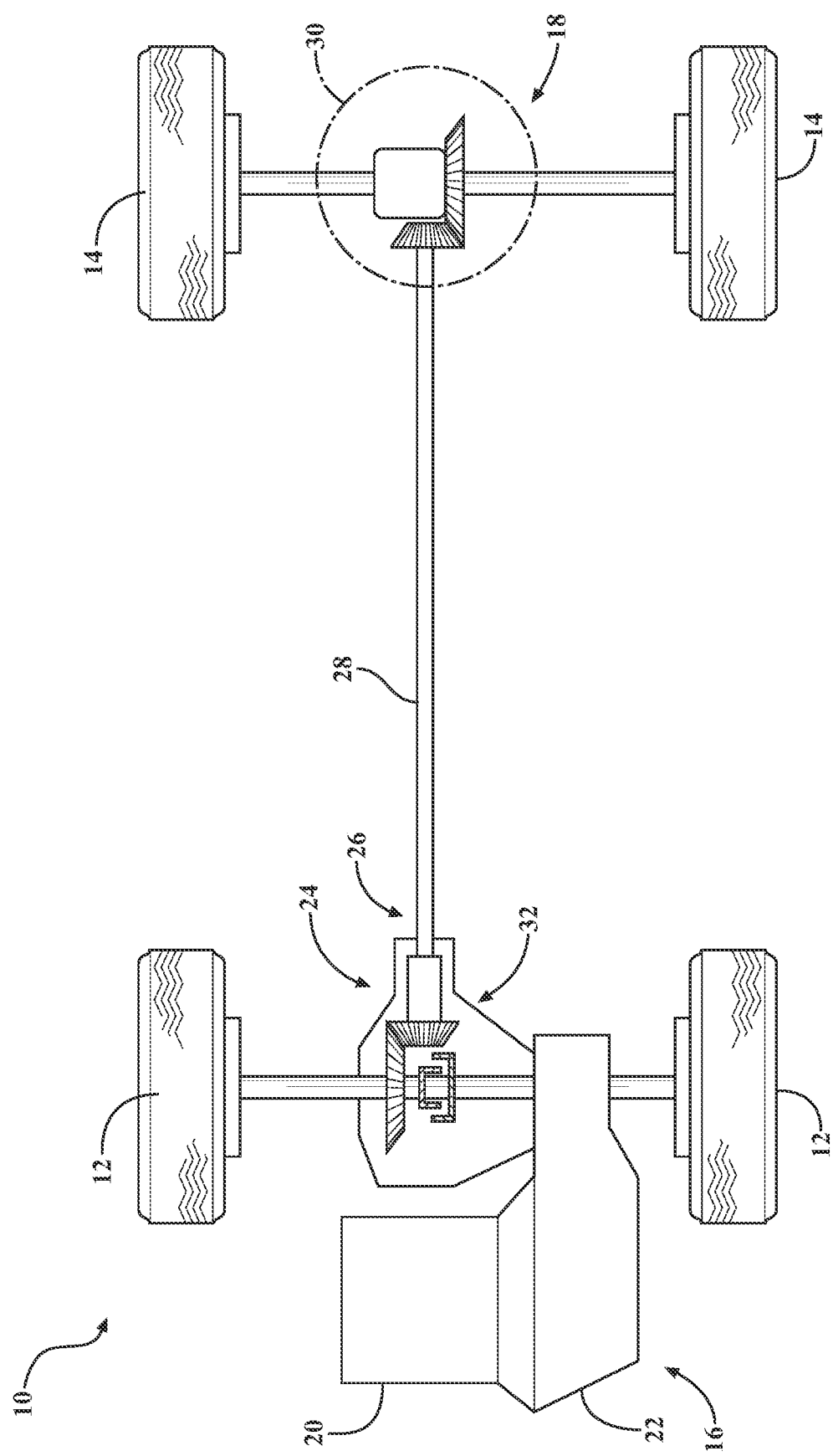
FIG. 1 is a diagram illustrating a vehicle drive train assembly including a transmission according to an embodiment of the present invention.

Referring to FIG. 1, FIG. 1 illustrates an exemplary vehicle drive train assembly 10 for transferring torque to first or main set of wheels 12 and a second or secondary set of wheels 14 of a vehicle. The drive train assembly 10 includes a main or front driveline 16 and a secondary or rear driveline 18. The front driveline 16 includes, among other components, an engine 20, a transmission 22 according to the present disclosure and a power take off unit 24 (PTU). The PTU 24 includes an output 26 to transmit torque through a propeller shaft 28 to secondary drive unit and specifically a rear drive unit 30 (RDU) for driving the rear wheels 14. A controller (not shown) may be in communication with the components in the front driveline 16 and rear driveline 18 and also in communication with one or more sensors located throughout the vehicle.

Referring to the figures, in certain applications, a transmission with large torque multiplication ratios (gear ratios) in the range of 24:1 in low range and 14:1 in high range may be required. Other applications may require final gear ratios in the range of 17.9:1 in low range and 8.8:1 in high range. In some embodiments, a planetary gear set configured as a speed change gear set can be coupled with a step pinion planetary gear set to reduce the overall ratio requirements to the range of 8:1 in low range and 4.66:1 in high range. In some embodiments, the gears defining the input and output of the transmission may be on the same axis or may be on parallel axes in relation to each other (i.e. have a parallel centerline) with respect to each other.

Figure 2:
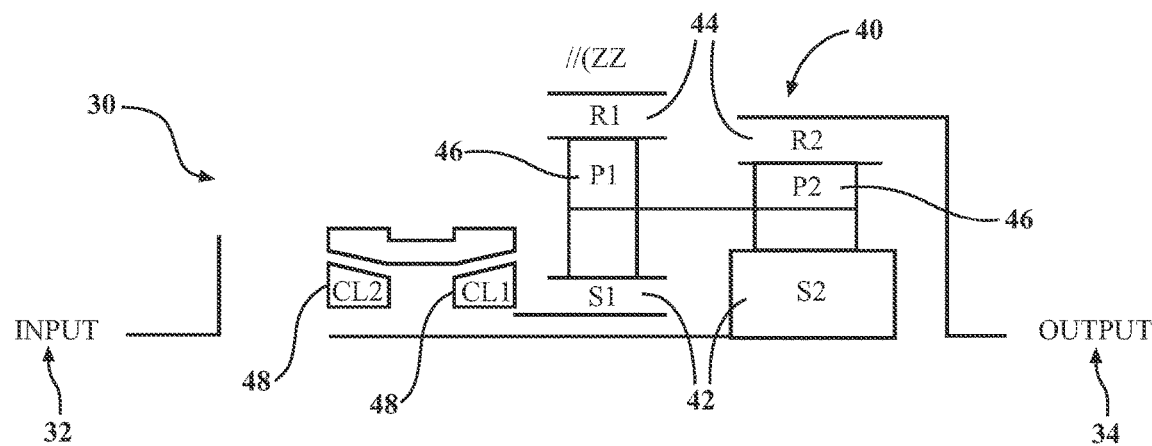
FIG. 2 is a schematic representation of a configuration for a step pinion transmission.

FIG. 2 shows a schematic of an ideal configuration of the elements for a step pinion transmission 30. As seen in FIG. 2, the transmission includes an input 32 through which power enters the transmission and an output 34 which delivers the power from the transmission to for example, wheels 12 or 14. The input and output may be comprised of one or more rotating elements fixedly connected to one another (shaft). The transmission may also include one or more gear assemblies 40 comprising rotating elements and shift elements configured to impose specified gear ratios among the rotating elements and configured to rotate as a unit by means of spline connections or other means. The gear assemblies may comprise a combination of one or more sun gears 42, one or more ring gears 44, and one or more pinion gears 46. The transmission may also include one or more clutches 48 which selectively couple two or more of these rotating elements to one another.

However the diametrical limitation of the transmission requires that the sun gears maintain a small size. This and the size limitation of the planetary gears may preclude the arrangement shown in FIG. 2 as generally the size of sun gear 42 (S1) will not allow a transmission shaft (not shown) to be passed through the internal diameter of the transmission. In addition, generally, a step pinion planetary gear set has a single sun gear with a planetary carrier output that provides a single gear ratio. Adding an additional sun gear to a typical step pinion planetary gear set can provide a second gear ratio; however, this may not be sufficient to achieve the necessary high and low range gear ratios.

It may be possible to achieve the required ratios by reconfiguring the typical step pinion gear set by using a step pinion planetary gear assembly with two sun and ring gears and in which one of the ring gears is "grounded" by rigidly fixing it to the housing or cover of the transmission system, the second ring gear is used as the transmission output and one of the sun gear is configured as the transmission input. Such a configuration makes it possible to generate gear ratios in the required range.

Figure 3:
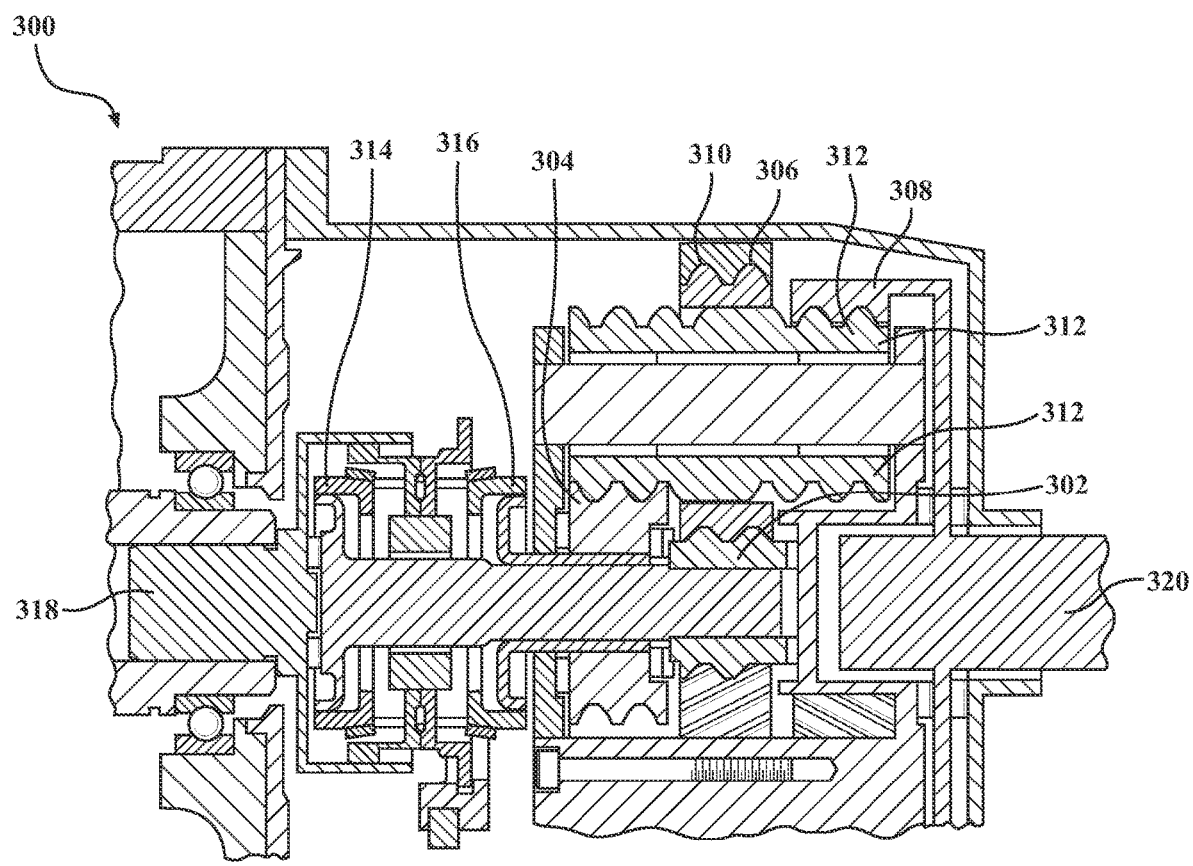
FIG. 3 is a cross sectional view of a transmission according to an embodiment of the present invention.

Referring now to FIG. 3, FIG. 3 discloses an example transmission 300 according to an embodiment of the present invention. The transmission includes a gear assembly comprising one step pinion planetary gear set comprising first and second sun gears 302, 304 and first and second ring gears 306, 308 in which the first sun gear 302 and the second ring gear 308 are spaced longitudinally in the same axis. Where the gear assembly comprises multiple step pinion gear sets, this is not required for the elements of the additional step pinion gear sets. The design shown in FIG. 3 is referred to as a step pinion gear set as the pinion gear set has 2 or more sets of gear teeth and the tooth counts are not equal. In the disclosure herein, each set of gear teeth of the step pinion gear sets described herein may also be called a pinion.

In the configuration shown in FIG. 3, ring gear 308 is positioned on the outboard side of the transmission (that is, it is configured as the transmission output). Despite the small size of sun gear 302 relative to the other gears, a shaft may be configured to pass through sun gear 302. Sun gear 304 is inboard of sun gear 302 due to sun gear 304 being a larger gear (because of ratio). The larger inside diameter of sun gear 304 more easily allows for the packaging of a bearing and hub to allow for gear selection. In addition, for assembly purposes, the smallest diameter gear inside diameter must be on one end. As a result, in this embodiment, sun gear 304 is placed on the inboard side of ring gear 306 which is grounded by rigidly fixing it to the housing of the transmission 300. In order to transfer the required motion of the planetary from a first sun gear 304 to a second ring gear 308 it is necessary to extend pinion gear 310 through pinion gear 312. In a normal planetary gear set, this is not possible. However, in a step pinion planetary gear set, the pinion gears are interconnected as seen more clearly in FIG. 2. Shifting from low to high range is accomplished by transferring power from a first clutch 314 to a second clutch 316. In the embodiment shown in FIG. 3, the clutch assembly is a synchronizing clutch assembly, such as for example a HOERBIGER™ synchronizer. However, any suitable synchronizer or clutch assembly may be used.

Referring now to FIG. 4, the two speed single gear set transmission 300 is shown in low range operation at a gear ratio of about 24:1. The transmission 300 includes two pinion gears 310, 312, each of which has first and second sun gears 302, 304 and ring gears 306, 308. In this embodiment, sun gear 302 operates as the input of the transmission, while ring gear 308 operates as the output of the transmission and they are respectively spaced mutually on the same longitudinal axis. In this embodiment, power from a motor, electric drive motor or other power generating device (not shown) enters the transmission through a drive shaft 318, which in some embodiments may be the drive shaft of an engine. Various motors known in the art may be used. The operating speed of the motor may be varied depending on the requirements of the transmission and its operation mode.

Power from the drive shaft 318 is transferred to the synchronizing clutch assembly 330 such as for example a HOERBIGER™ synchronizer. Various other synchronizer assemblies may be used as may be known in the art. Power is transferred through the clutch assembly by means of a power transferring unit 332 which transfers power to a drive hub 334. Drive hub 334 is connected to an engagement ring 336. Drive hub 334 is a support means for synchronizer 330. Rings (not shown) either side of the synchronizer assembly 330 transfer the power to a first gear set comprised of sun gear 302, 304 and ring gear 306, 308. A friction absorbing device 338 is disposed between the power transferring unit 332 and the drive hub 334 to help absorb or reduce the speed difference between the power transferring unit 332 and the drive hub 334.

In operation, power from the drive shaft 318 flows through the engagement ring 336 and into step pinion gear set through sun gear 302. This gear set includes a pinion gear 310. Pinion gear 310 is in constant mesh with sun gear 302 and ring gear 306 of the pinion gear set. The force generated at the mesh between sun gear 302 and pinion gear 310 causes pinion gear 310 to rotate about a pinion pin 340. Ring gear 306 is grounded as described above by rigidly splining it to a gear case, housing, cover, or other enclosure such that it is not free to rotate about the other gear components. With ring gear 306 thus stationary, the rotational motion of pinion gear 310 about pinion pin 340 causes planetary carrier 342 to rotate about the transmission axis. In this embodiment, pinion gears 310 and 312 are rigidly attached together by means of splines or other attachment means. As with pinion gear 310, pinion gear 312 is similarly in constant mesh with corresponding sun gear 304 and ring gear 308. Ring gear 308 is the internal gear of the gear assembly and also acts as the output of the transmission 300. The power of the transmission thus travels from the input sun gear 302 and is output through ring gear 308 and into the wheels 12 or 14 of a vehicle. In this embodiment, the 2 pinion gears 310 and 312 are fixedly coupled together and their rotation causes ring gear 308 to rotate at the desired ratio. The desired ratio may vary, but in this embodiment, the transmission rotates at a gear ratio of about 24:1.

Figure 5A:
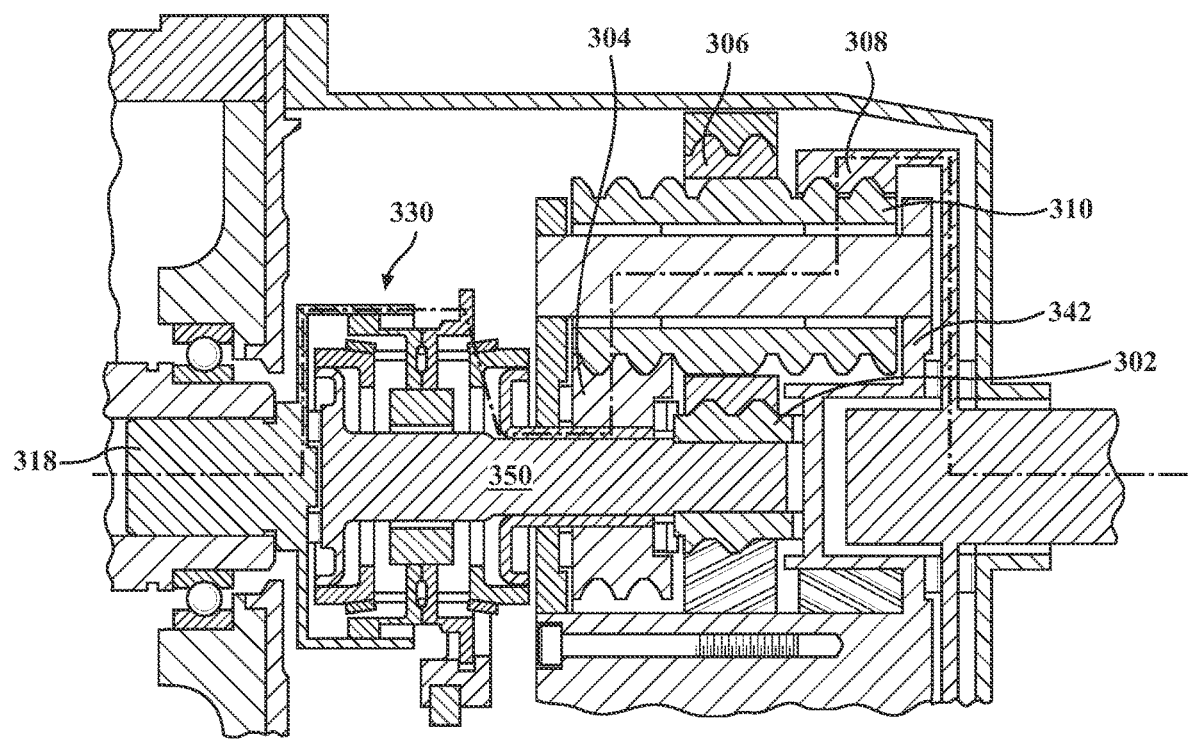
FIG. 5A is a cross sectional view of the transmission of FIG. 3 in high range position showing transmission power flow through a first sun gear.
Figure 7A:
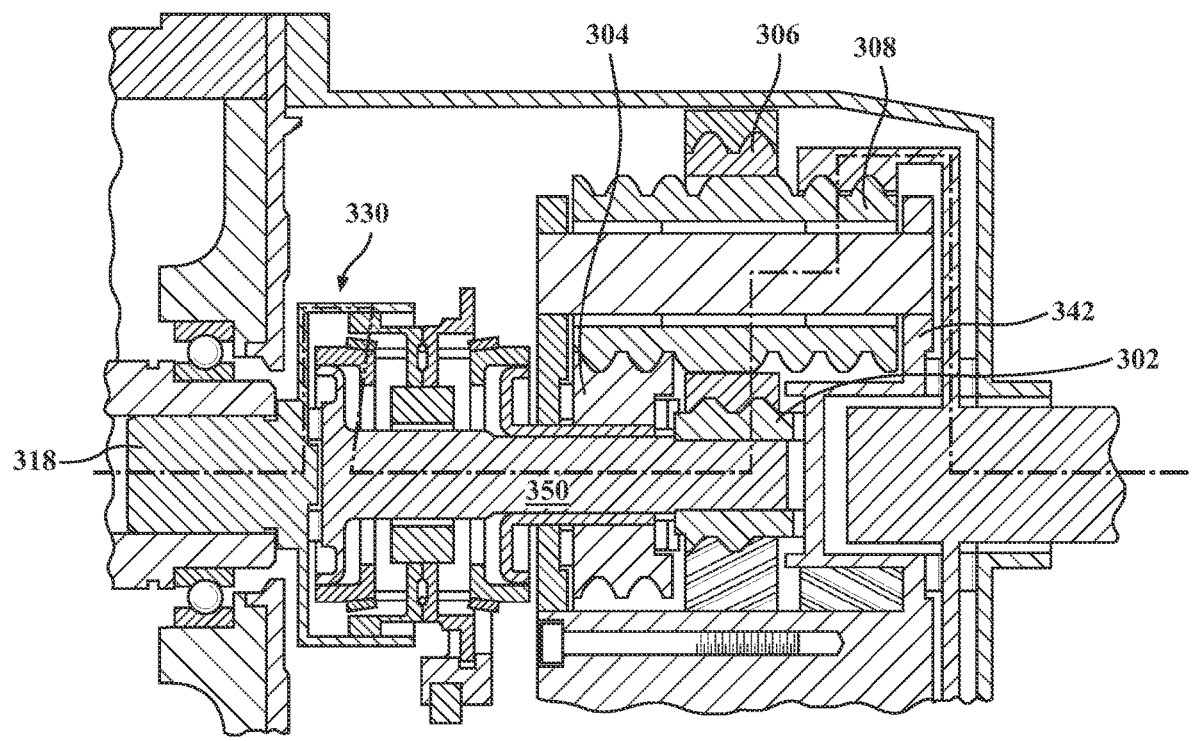
FIG. 7A is a cross sectional view of the transmission of FIG. 3 in low range position showing transmission power flow through a second sun gear.
Figure 5B:
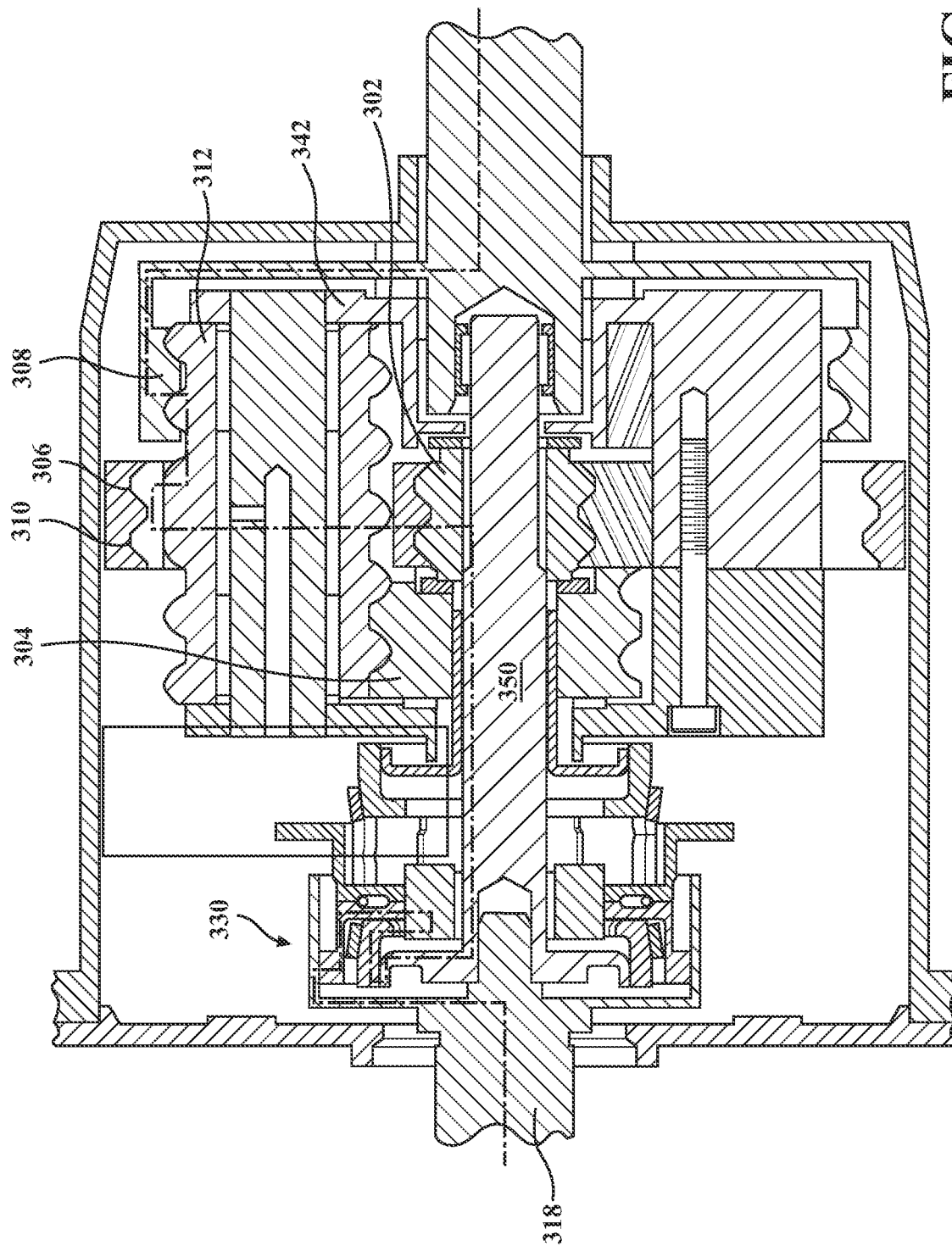
FIG. 5B is a cross sectional view of the transmission of FIG. 3 in low range position showing transmission power flow through a second sun gear.

Referring now to FIGS. 7A and 5B, the power flow of the transmission shown in FIG. 4 during low range operation, when the gear ratio is about 24:1, is shown. As can be seen in FIGS. 7A and 5B, at low range operation, power is transferred from a power means such as an electric drive motor 318. The power is transferred through an input shaft 350 and into sun gear 302 which acts as the transmission input. In both FIGS. 7A and 5B power flows through sun gear 302 which acts as the transmission input. Clutch assembly 330 selectively engages sun gear 302 to ensure power is transmitted to and through sun gear 302 and then travels through pinion gear 310, outputted through Ring Gear 308 and into the drive of wheels 12 or 14 for example.

Whether power is input through sun gear 302 or 304, both sun gears are always in mesh spin simultaneously. However, the speed ratio will determine which of sun gear 302 or sun gear 304 will have power input through it and subsequently drive the movement of the other. When one sun gear 302 or 304 is engaged, the other sun gear 302 or 402 is disengaged and is rotated solely by movement of the complementary sun gear.

Figure 6:
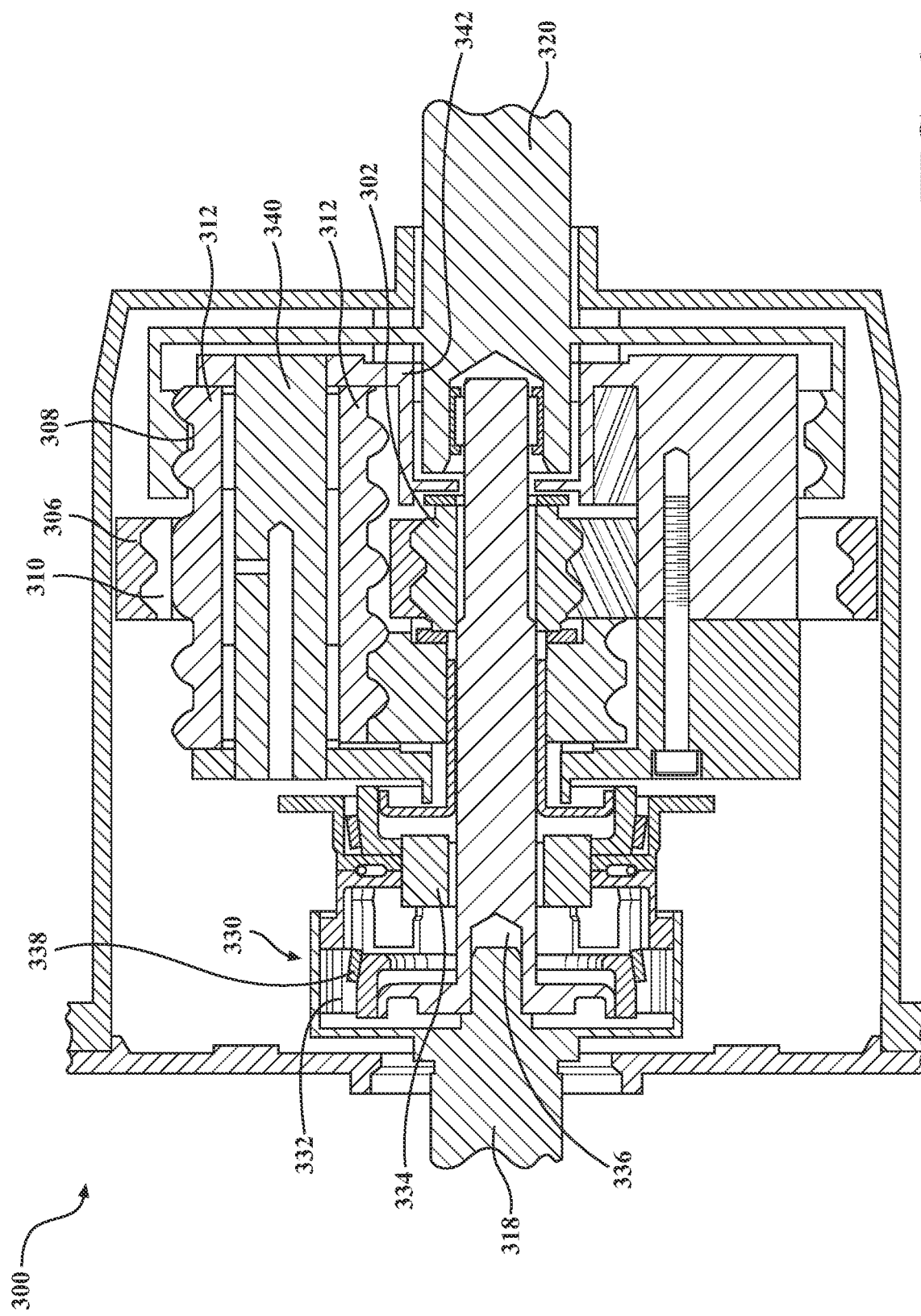
FIG. 6 is a cross sectional view of the transmission of FIG. 3 in a high range position.

Referring now to FIG. 6, two speed single gear set transmission 300 of FIG. 3 is shown in high range operation at a gear ratio of about 8:1. However, the elements required for obtaining the ratio change are different. At high range, transmission 300 operates similarly to low range. In high range operation, the opposing sun gear (in this case, sun gear 302) is disengaged from the synchronizer and the input shaft and is moved by means of sun gear 304.

As with low range operation, at high range, the power from the motor or other generating device enters the transmission at the drive shaft 318. Power from the drive shaft 318 is transferred to the synchronizing clutch assembly 330, such as for example a HOERBIGER™ synchronizer, by the clutch assembly 330 being moved to the right side to engage the synchronizer with the input shaft. In some embodiments, the synchronizer 330 may be splined to the input shaft and engaged by other connecting means. Similarly to low range operation, power is transferred through the clutch assembly by means of power transferring unit 332 which transfers power to a drive hub 334. Drive hub 334 is connected to the engagement ring 336. Drive hub 334 is a support means for synchronizer 330. Rings (not shown) on either side of the synchronizer assembly 330 transfer the power from synchronizer 330 to a first gear set comprised of sun gears 302, 304 and ring gears 306, 308. A friction absorbing device 338 is also disposed between the power transferring unit 332 and the drive hub 334 to help absorb or reduce the speed difference between the power transferring unit and the drive hub 334. The power flows into sun gear 304 which acts as the transmission input. Sun gear 302 is then disengaged and rotates only through its association with sun gear 304. As with low range operation, pinion gear 312 is in constant mesh with sun gear 304 and ring gear 308. However, at high range operation, pinion gear 312 is the driving force for the transmission.

The force generated at the mesh between pinion gear 312 and sun gear 304 causes pinion gear 312 to rotate about pinion pin 340. In this embodiment, pinion gear 310 is similarly rigidly attached to pinion gear 312. Similarly, ring gear 306 is grounded by rigidly splining it to a gear case, housing, cover, or other enclosure (not shown) such that it is not free to rotate and ring gear 308 acts as the output. With ring gear 306 stationary the rotational motion of pinion gear 312 about pinion pin 334 causes planetary carrier 342 to rotate about the transmission axis. In this embodiment, pinion gear 312 is in constant mesh with sun gear 304 and ring gear 308, which is the internal gear of the planetary gear assembly and also acts as the output of the transmission. In operation, since the 2 pinion gears 312 and 312 are splined together, when carrier 334 rotates about the transmission axis, this causes the internal gear 308 to rotate also at the desired ratio.

Figure 7B:
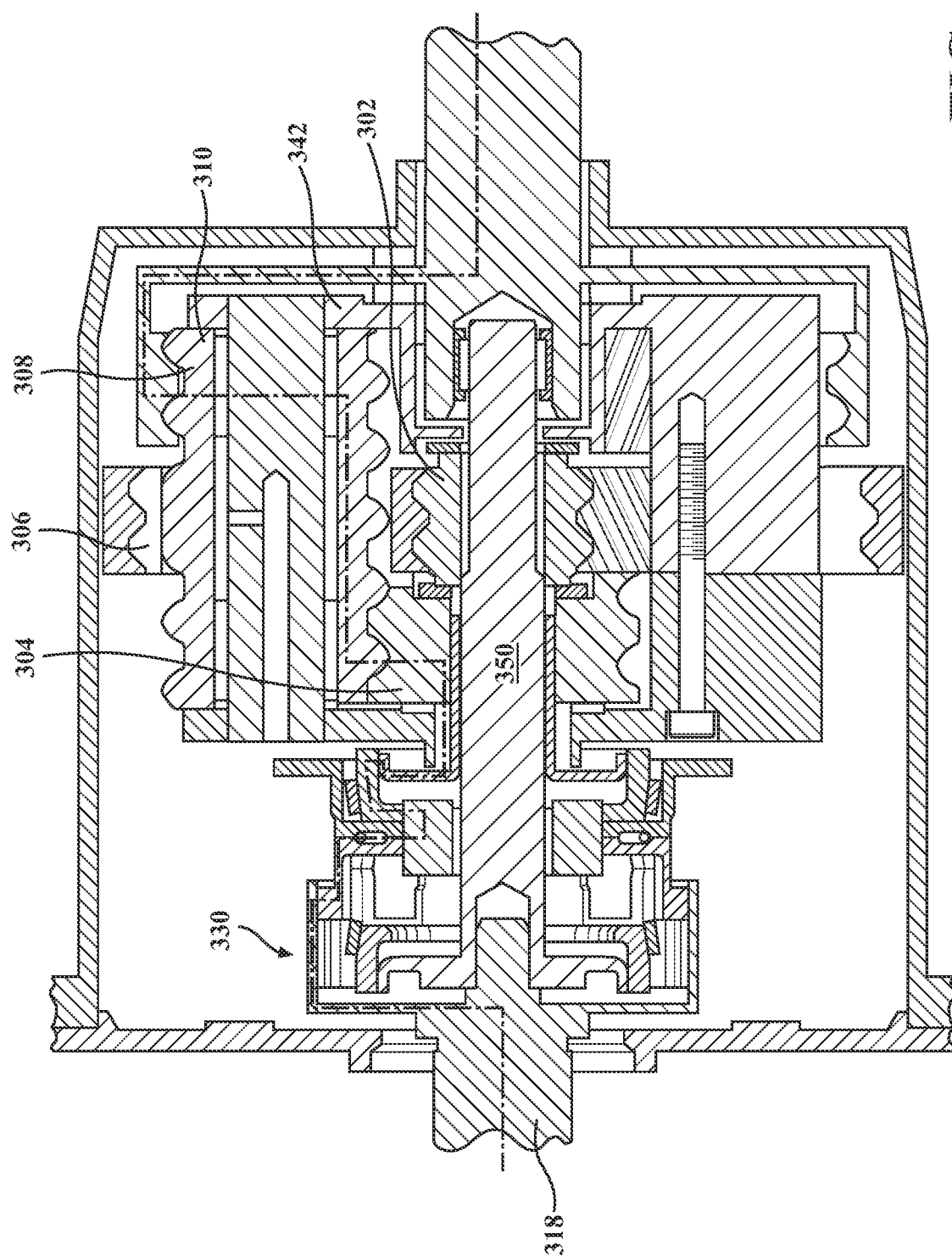
FIG. 7B is a cross sectional view of the transmission of FIG. 3 in high range position showing transmission power flow through a first sun gear.

Referring now to FIGS. 5A and 7B, the power flow of the transmission during high range operation, when the gear ratio is about 8:1, is shown. As can be seen in FIGS. 5A and B, at high range operation, power is transferred from a power means such as an electric drive motor shaft 318. The power is transferred through an input shaft 350 and into sun gear 304. In the embodiments shown in FIGS. 5A and 7A, power flows through sun gear 304 which acts as the transmission input. Clutch assembly 330 selectively engages sun gear 304 to ensure power is transmitted to sun gear 304. Power then travels through the associated pinion gear 310 and is outputted through Ring Gear 308 to a wheel 12 or 14 for example.

Referring to FIGS. 8A to 8F, there is shown a second example two speed transmission 400 in which a primary reduction gear set is added to the embodiment shown in FIGS. 3 to 7 axially before the clutch assembly. In this embodiment, the step pinion planetary gear assembly comprises a single ring gear. The primary reduction gear set may be a planetary gear set which is used to multiply torque (for example by a factor of 3) and the power goes to the planetary gear set which functions as a speed change gear set. In operation, this reduces the overall ratio requirements of the speed gear set from 24:1 to 8:1 in low range and from 14:1 to 4.66:1 in high range. These new ratios are more reasonable for a normal step pinion gear set. Various combinations of gear sets and clutches may selectively impose particular gear ratios.

In operation, power flows from the electric motor or any other generating device by means of drive shaft 402. The power is then transferred to the primary reduction gear set. The gear set is composed of a sun gear 404, a ring gear 410 rigidly attached to ground by means of splining it to a gear case cover, or housing (not shown) as previously described, and a planetary carrier 408 with plurality of planet pinions 406. As the sun gear 404 turns it drives the planet pinions 406 to rotate around the stationary ring gear 410. The primary reduction ratio is equal to the number of teeth on the sun gear divided by the sum of the number of teeth on the sun gear and ring gear (i.e. S/(R+S). The output of the primary reduction gear set is the planetary carrier 408. The power from the primary reduction gear set is transferred to a selectable synchronizing clutch assembly 420, which may be a HOERBIGER™ synchronizer or another suitable synchronizer, via a spline 422. A slide shift collar (drive hub) 424 is connected to spline 422 and the spline 422 and slide shift collar 424 are physically connected and retained together at engagement hub 426. Friction absorbing devices 428 and 430 are disposed between the engagement hub 426 and clutch engagement rings 432 or 434 to help absorb or reduce speed differences between engagement hub 426 and clutch engagement rings 432 or 434. In the neutral state (FIG. 8A), the engagement hub 426 is disposed approximately in the middle between engagement rings 432 and 434 and no power can be transferred through the synchronizer assembly 420.

Figure 8A:
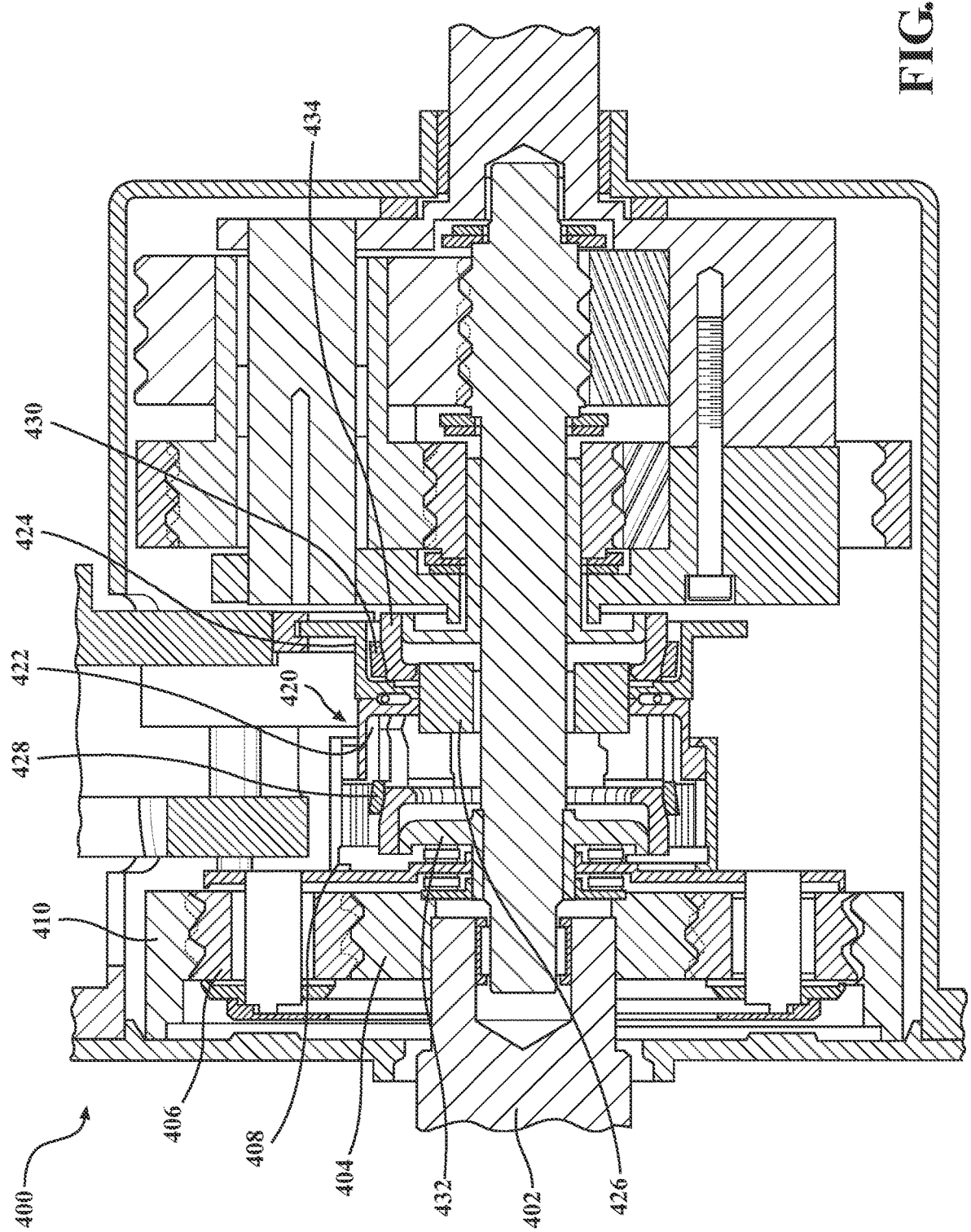
FIG. 8A is a cross sectional view of a transmission according to another embodiment of the present invention in neutral position.
Figure 8B:
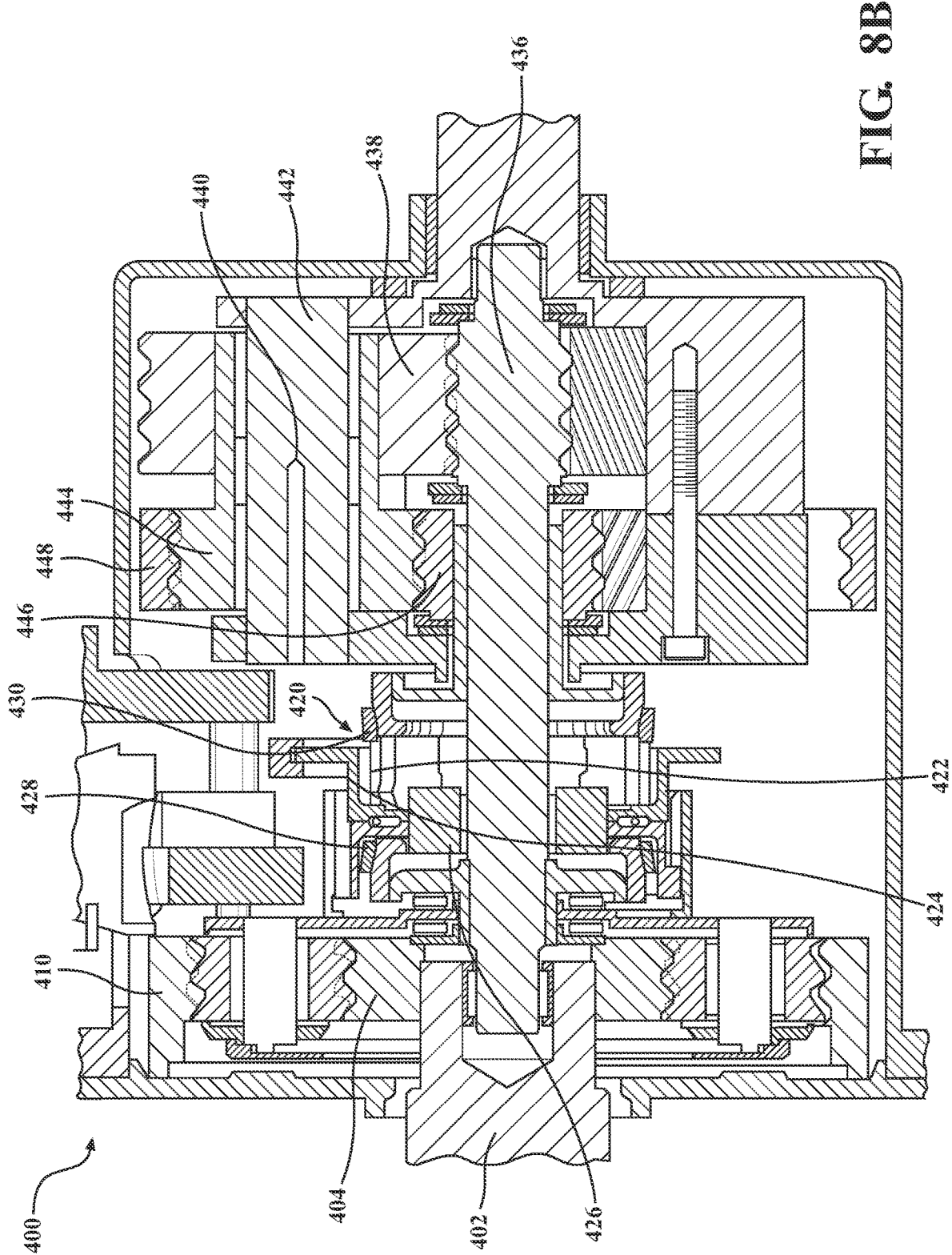
FIG. 8B is a cross sectional view of the transmission of FIG. 8A in a low range position.
Figure 8C:
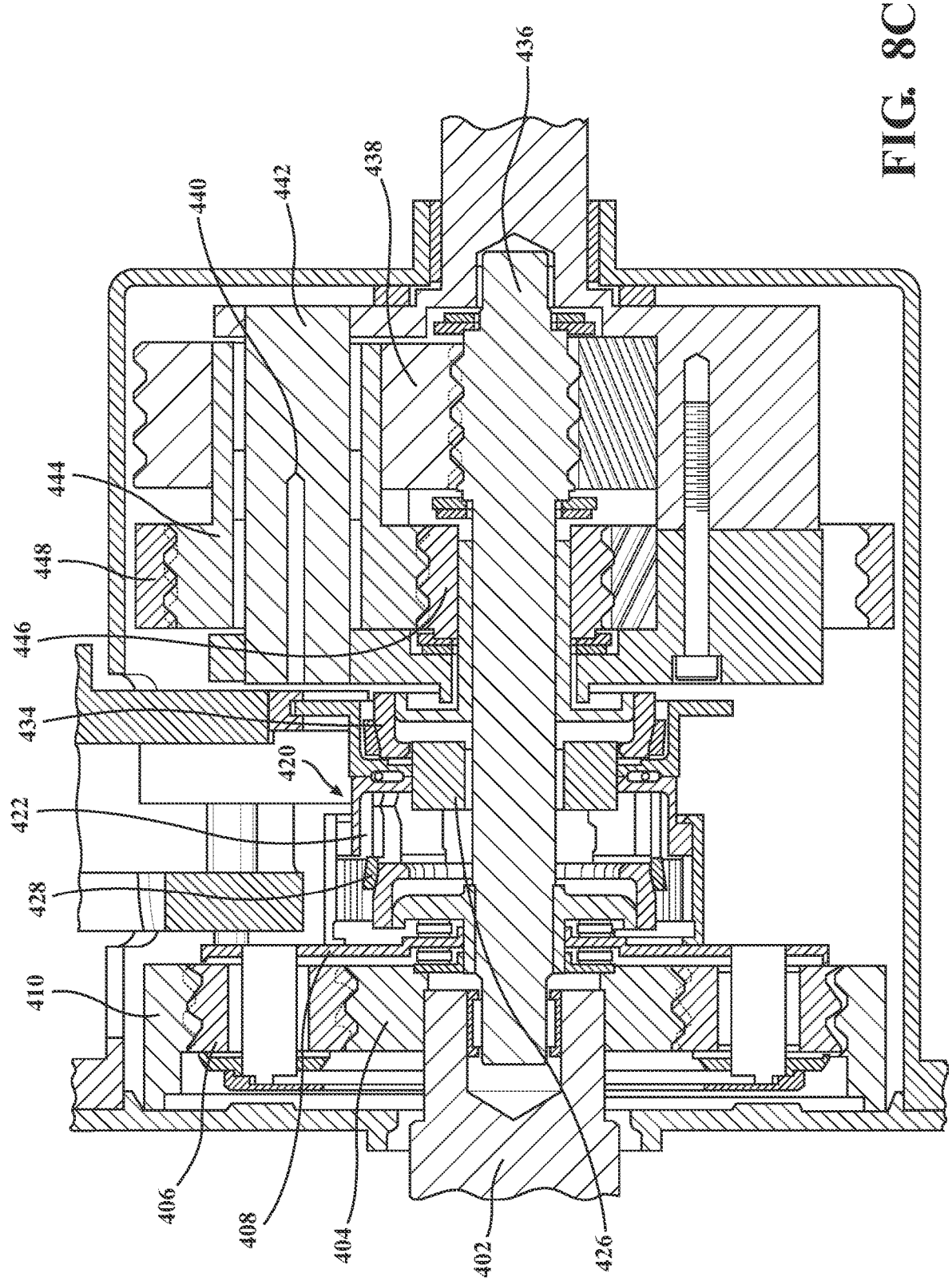
FIG. 8C is a cross sectional view of the transmission of FIG. 8A in a high range position.

In the low range state (FIG. 8B), power is transferred from the primary reduction gear set to the drive hub 424 of the synchronizer assembly 420. The spline 422, the drive hub 424 and the engagement hub 426 are fixedly coupled together and move as a unit. Movement by these components toward the drive shaft 402 forces the transmission into low range (FIG. 8B). Movement away from the drive shaft 1 will force the transmission into high range (FIG. 8C).

In the low range state, the power from the motor through the primary reduction gear set is transferred to the engagement ring 432 which drives sun gear 436 of the planetary pinion gear set. Sun gear 436 pushes the planetary pinion gear 438 to rotate about pinion pin 440, which is part of planetary carrier 442. As with the embodiment shown in FIGS. 3-7, pinion gear 438 and pinion gear 444 of the planetary gear assembly are permanently affixed or coupled by a spline or other means and both freely rotate about pinion pin 440. As with the embodiment shown in FIGS. 3-7, pinion gear 444 is in constant mesh with sun gear 446 and ring gear 448, which is permanently affixed to ground as described herein. As ring gear 448 is fixed and unable to rotate, the movement of pinion gear 438 rotates pinion gear 444 and the gears 438 and 444 are rotated about pinion pin 440. The rotational motion of pinion gears 438 and 444 is then transferred to planetary carrier 442 which then rotates about the transmission axis.

Figure 8D:
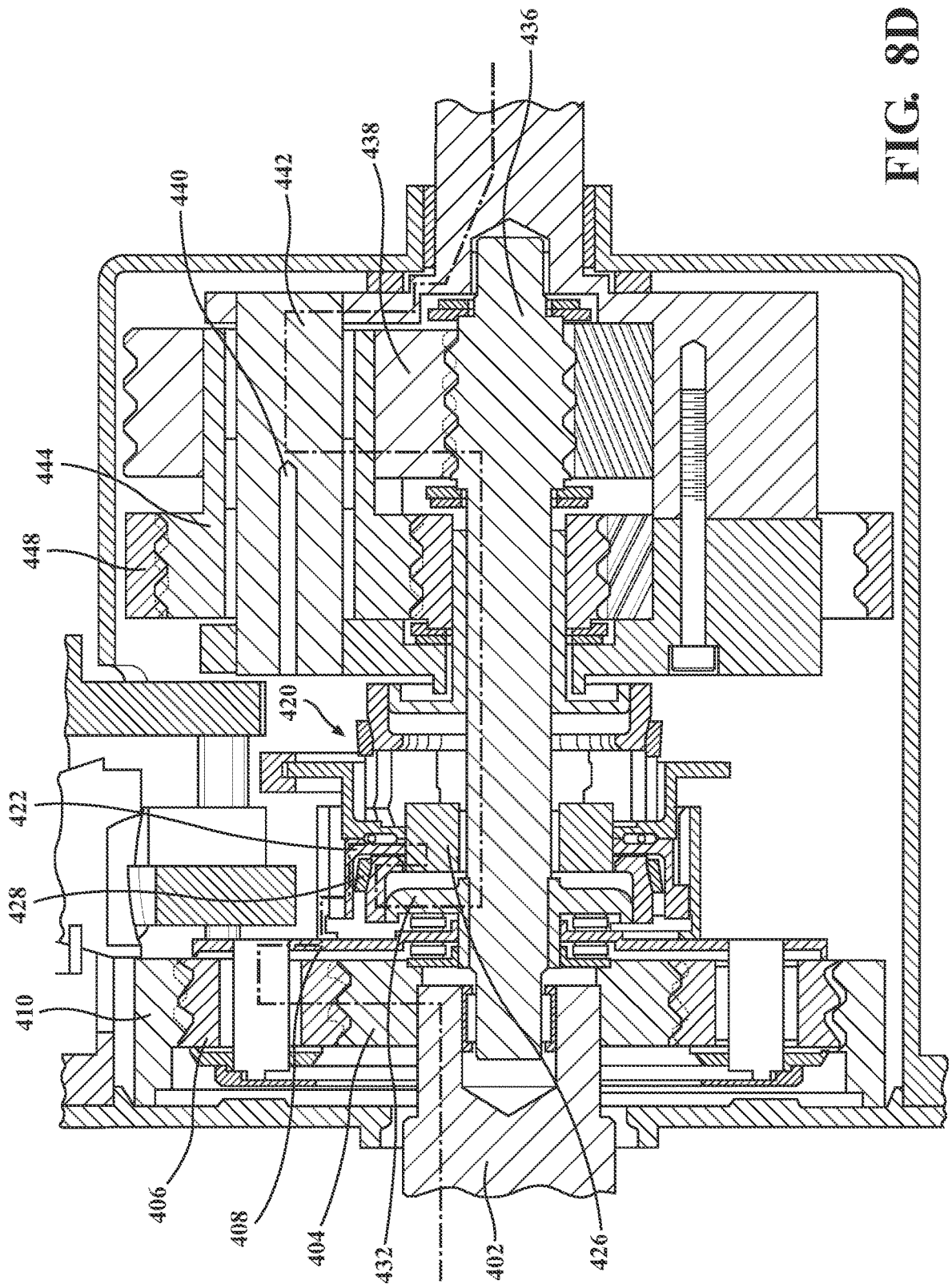
FIG. 8D is a cross sectional view of the transmission of FIG. 8A in low range position showing transmission power flow.

Referring now to FIG. 8D, the power flow in the low range state of the embodiment in FIG. 8B is shown. As described, in the low range state, the engagement hub 426 is engaged to engagement ring 432. Power flows through the drive shaft 402 and the engagement ring 432 and via the sun gear 436 and pinion gear 438. The rotation of pinion gears 438 and 448 is then transferred to Carrier 442.

In the high range state (FIG. 8C), the engagement hub 426 is positioned so that it engages engagement ring 434 which is then engaged with sun gear 446. Pinion gear 438 is in constant mesh with both sun gears 446 and ring gear 448, which is rigidly fixed to ground. In the high range state, sun gear 446 pushes on pinion gear 444 causing it to rotate about pinion pin 440 which is part of planetary carrier 442. As the ring gear 448 is fixed, the movement of pinion gears 448 and 438 is transferred to planetary carrier 442 which rotates about the transmission axis.

Figure 8E:
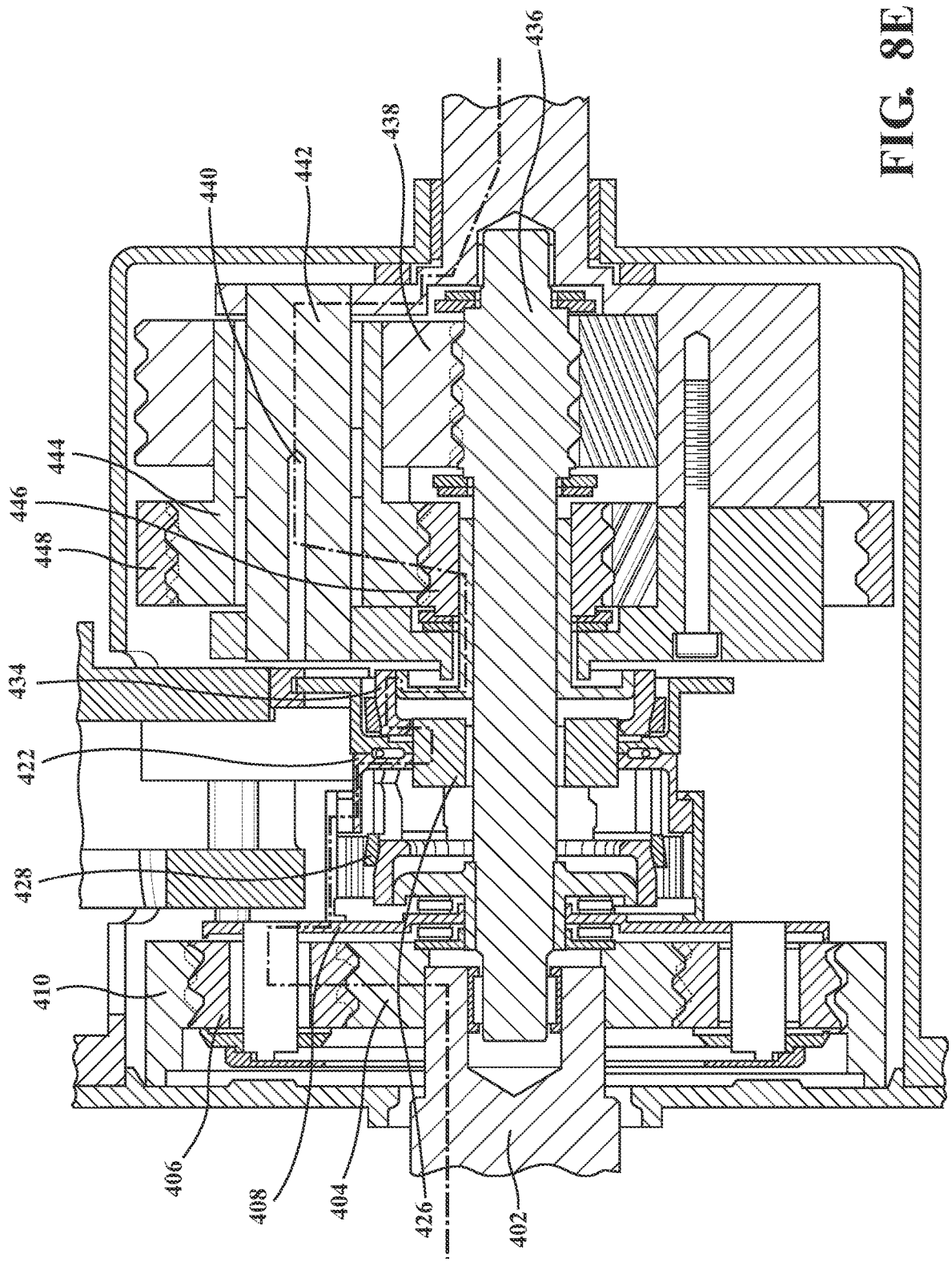
FIG. 8E is a cross sectional view of the transmission of FIG. 8A in high range position showing transmission power flow.

Referring to FIG. 8E, the power flow in the high range state of the embodiment in FIG. 8C is shown. As described, in the high range state, the engagement hub 426 is engaged to engagement ring 434. Power flows through the drive shaft 402, into the engagement ring 434 and via the sun gear 446 and pinion gear 444. The rotation of pinion gears 444 and 438 is then transferred to carrier 442.

Figure 8F:
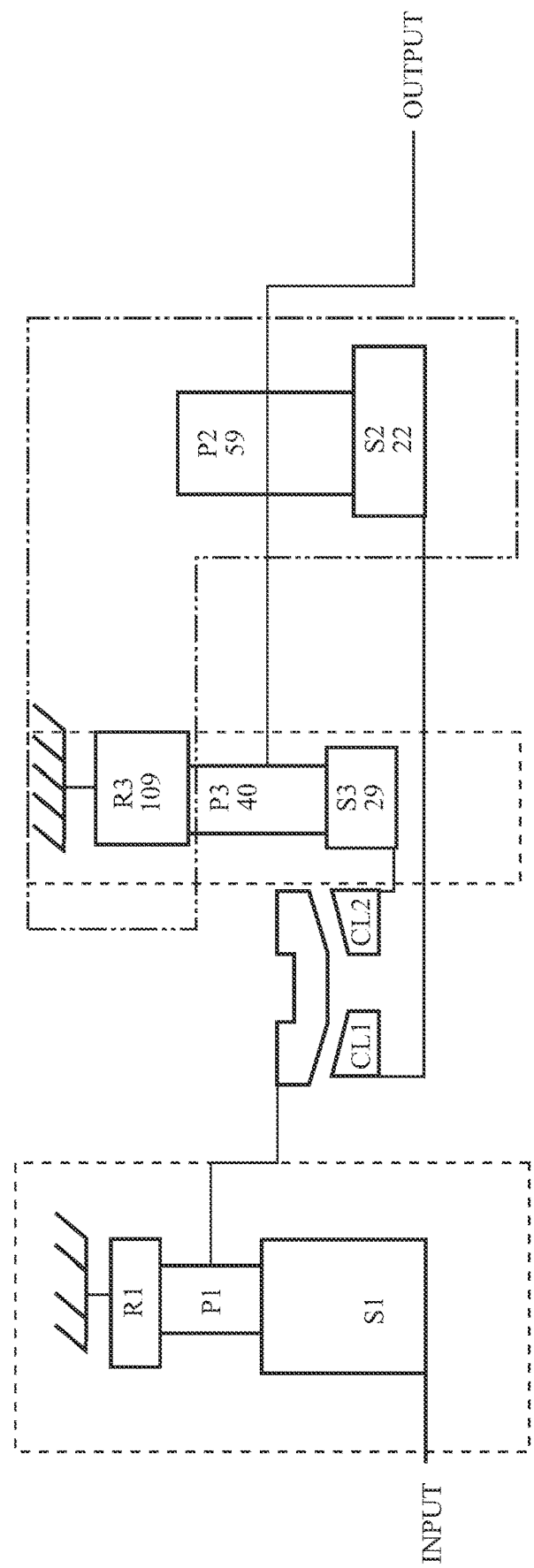
FIG. 8F is a schematic representation of the transmission of FIG. 8A.

FIG. 8F shows a schematic of the embodiments shown in FIGS. 8A to 8E showing the combination of elements of the transmission 400. Primary reduction gear set includes pinion gears P1 and ring and sun gears R1 and S1 respectively. The step pinion gear set includes pinion gears P2 and P3 which are splined together. Step pinion gear set includes a single ring gear R3 and two sun gears S2 and S3. The clutches for selectively engaging one of the sun gears S2 or S3 are represented by CL1 and CL2.

Various parameters summarizing the different modes of operation of the transmission shown in FIGS. 8A to 8F are shown in Table 1 below:

| Range | CL1 | CL2 | Sun1 | Ring 1 | Carrier | R3 Grounded | Sun 2 | Sun 3 | Carrier |
|---|---|---|---|---|---|---|---|---|---|
| Low | X | | INPUT | FIXED | SYNCHRO DRIVE | FIXED | | X | OUTPUT |
| High | | X | INPUT | FIXED | SYNCHRO DRIVE | FIXED | X | | |
| Neutral | | | INPUT | FIXED | SYNCHRO DRIVE | FIXED | | | |

In neutral mode, both clutch assemblies are disengaged, while in low and high range, clutch 1 and clutch 2 are selectively engaged. In this embodiment, the sun gear of the primary reduction gear set is the transmission input in all modes of operation and the ring gear is fixed. Alternatively, at low or high range, sun gear 1 or sun gear 2 of the step pinion planetary gear set may be selectively engaged to drive power through the transmission.

Figure 9B:
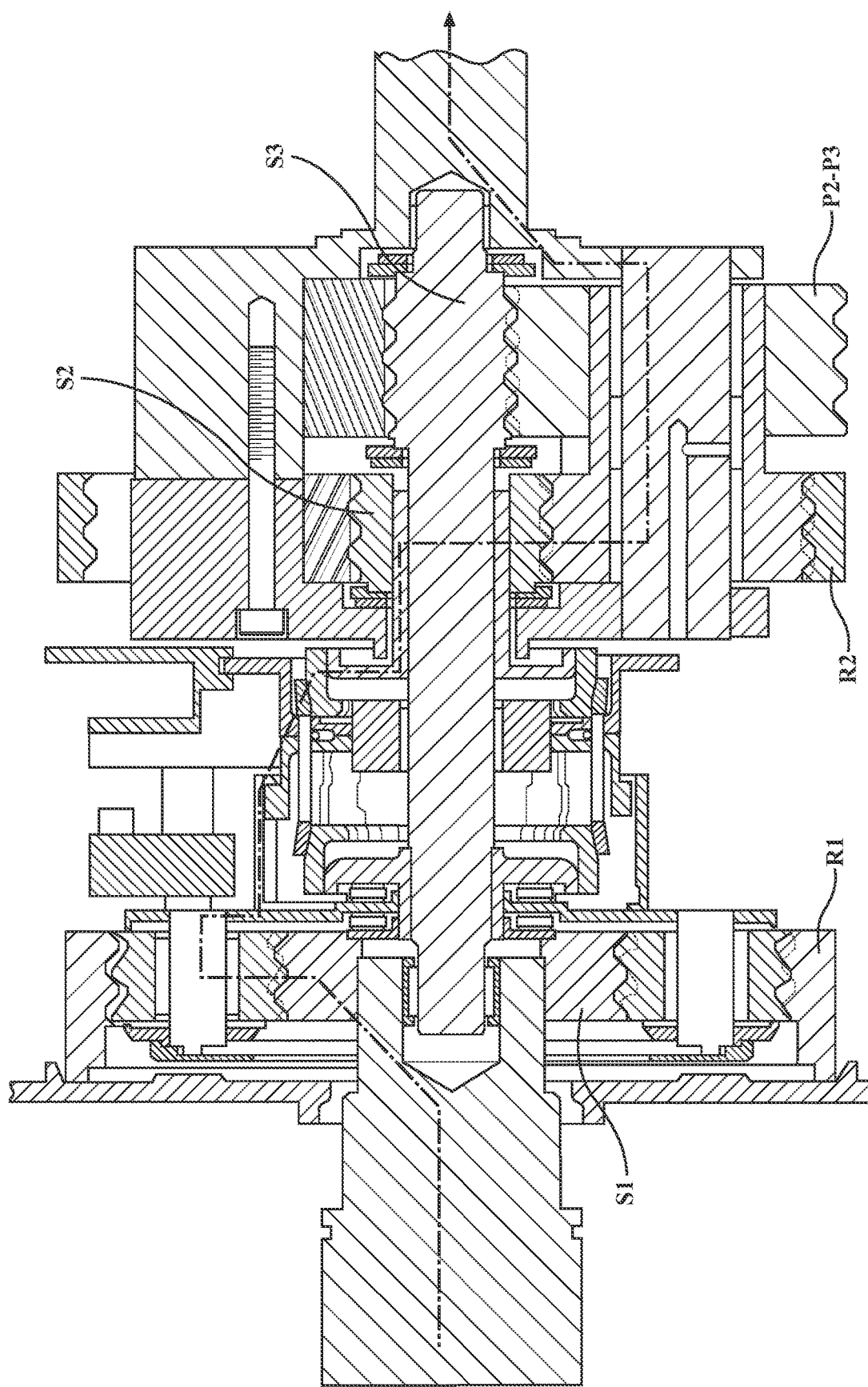
FIG. 9B is cross sectional view of the transmission of FIG. 8A in high range position showing transmission power flow.

Numerous variations are contemplated within the scope of the present disclosure. For example, various combinations and configurations of gear sets, clutches and shafts may selectively impose particular speed relationships and power flows as shown in FIGS. 9A and 9B. As seen in FIGS. 9A and 9B, the configuration of the transmission can be shifted to centre the rotational axis of the transmission and the transmission can include substantially the same parts as in transmission 400. Each of the rings R1 and R2 may be grounded as described herein and the pinion gears P2-P3 could be arranged in a step pinion transmission configuration. In addition, at high range or low range, S2 or S3 may be the input respectively.

Referring to FIGS. 10 to 16, there is disclosed a gearbox assembly 500 comprising a two speed transmission including in some embodiments, the two speed transmissions shown in FIGS. 4 and 8A where a radially compact transmission is required and the transmission further described below where an axially compact transmission is required.

In some applications, two speed transmissions with for example about 17.9 and 8.8 final gear ratios may be required. Such applications may therefore require a synchronized shift system in order to select between multiple gear sets corresponding to the gear ratios and may also require a friction material that brings the gear and the shaft to the same speed to allow a smoother shift between the two different gear sets.

Figure 10:
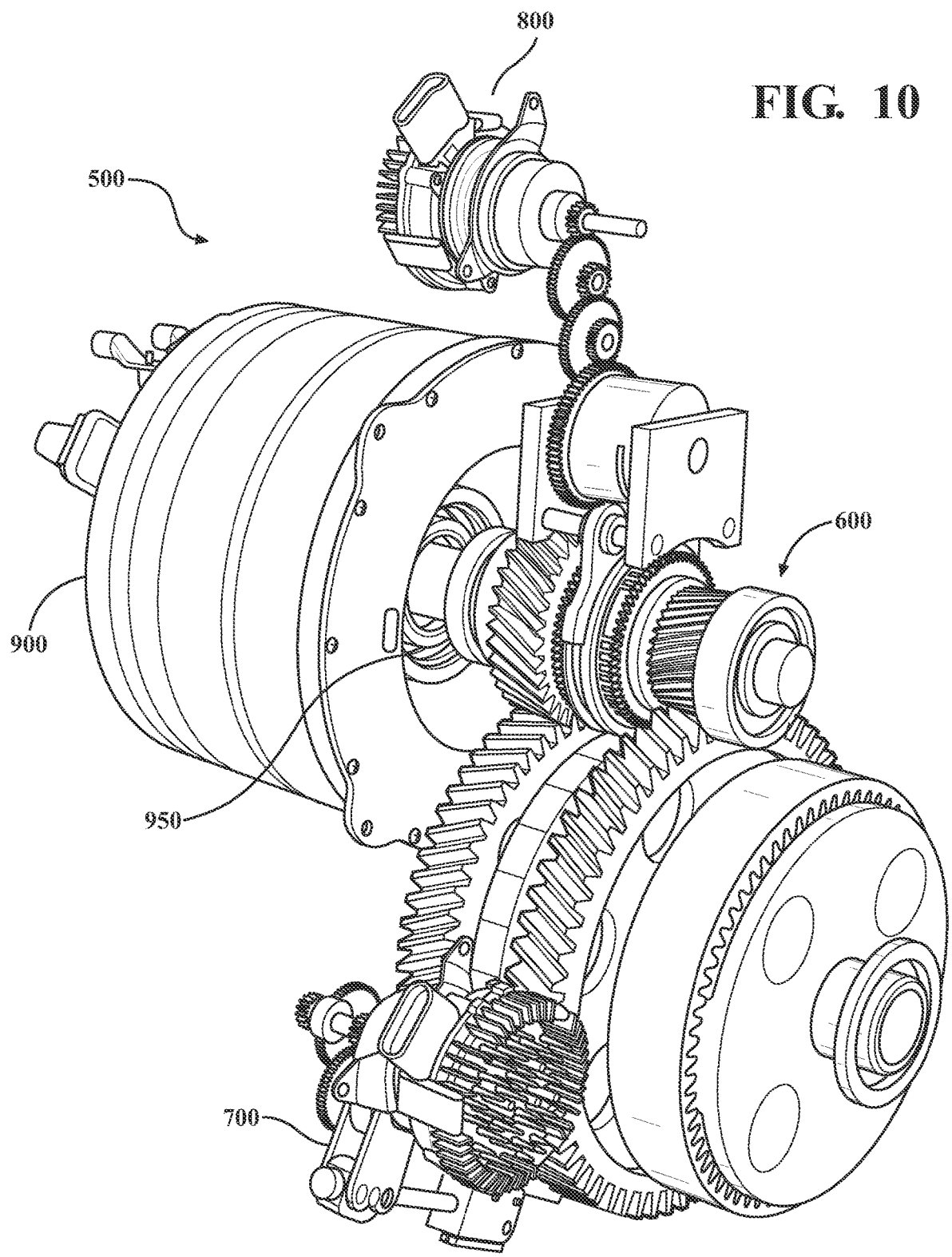
FIG. 10 is a perspective view of a gear box assembly and a transmission according to an embodiment of the present invention.

Referring to FIG. 10, in some embodiments, a transmission 600 comprising parallel axis gear set may be used including a pinion gear set and helical wheel gears defined by the pinion and wheel gears having a parallel centerline (that is the transmission input and output are mutually spaced in parallel axes relative to each other). In this embodiment, the gears are on different shafts that run parallel to each other. Such a parallel axis system is paired with a final planetary gear reduction located after rather than before the synchronizer assembly and which is configured to achieve the desired ratios. This design therefore allows a smaller axial package while maintaining high torque capacity and a synchronized two speed system. The transmission can be integrated into a complete drive unit comprising the parallel axis transmission 600 described herein with park Lock system, a gear shift mechanism 800, an electric drive motor 900, and an integrated drive motor inverter 950.

Figure 11:
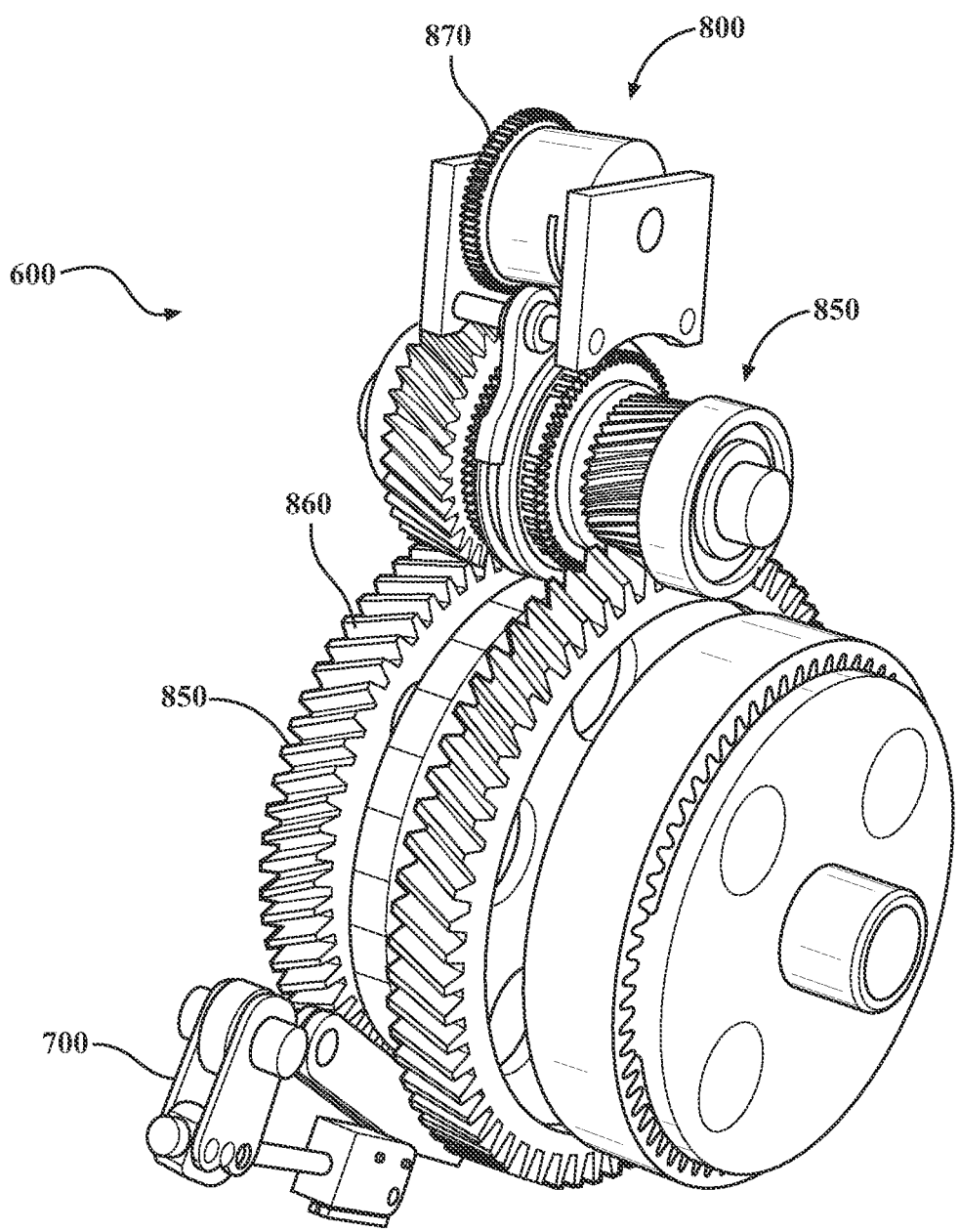
FIG. 11 is a perspective view of a portion of the gear box assembly and transmission of FIG. 10.
Figure 12:
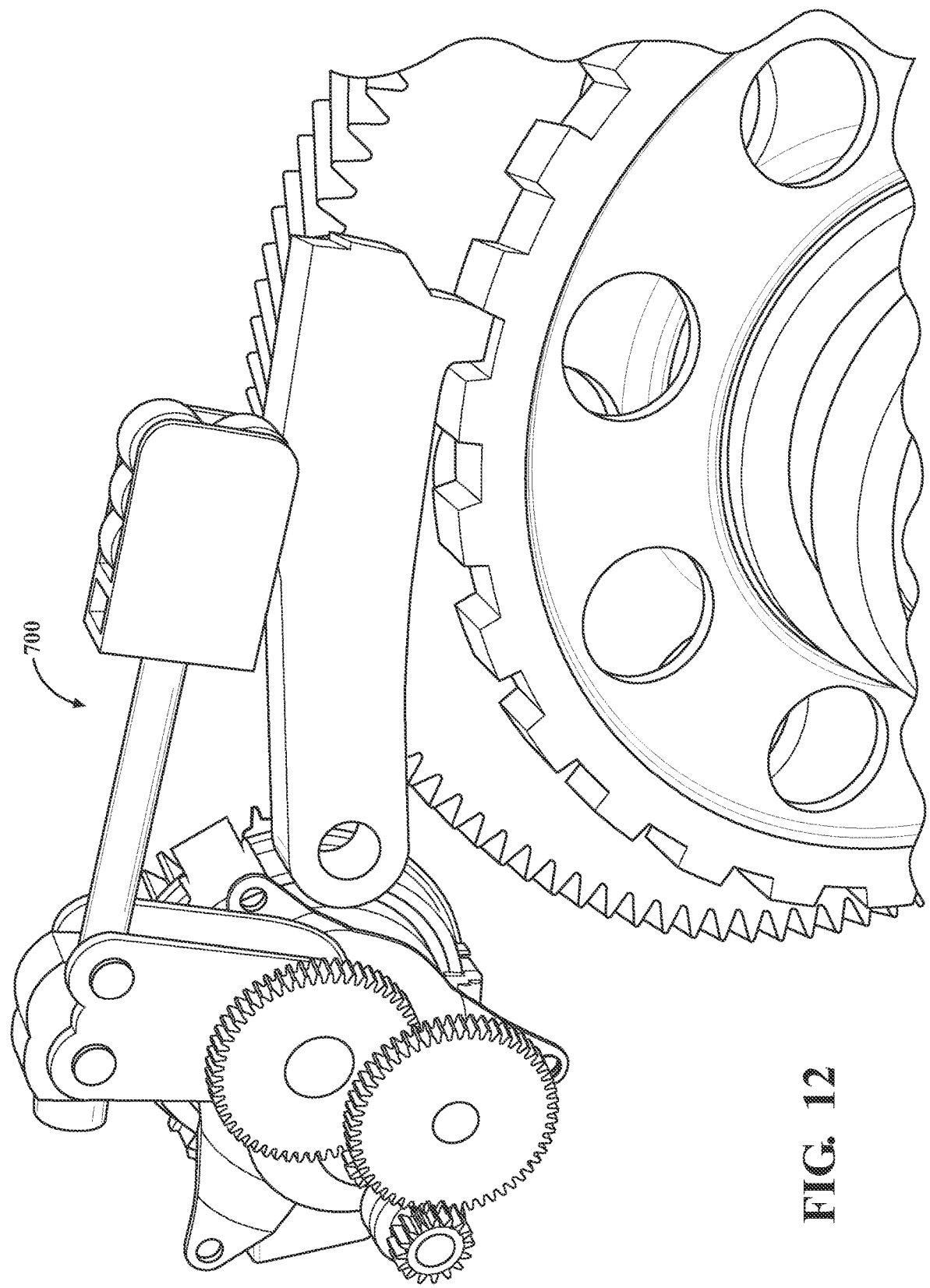
FIG. 12 is a perspective view of a portion of the gear box assembly and transmission of FIG. 10.

More clearly seen in FIGS. 11 and 12, the two speed synchronized transmission 600 comprises an electrically actuated gear shift mechanism 800, two helical gear sets 850, with a plurality of gears and having gear teeth 860, for speed selection, a shift barrel 870 and a planetary gear set 850 for additional speed reduction, with the final gear ratios of about 18.0 and 8.8 being achieved by selectively engaging either a high or low range pinion gear of one of the helical gear sets 850. The transmission also includes a separate independent park lock system 700 for each transmission 600, which is more clearly seen in FIG. 12. Each park lock system 700 is capable of supporting full vehicle load and also includes a park gear wheel (not shown) disposed axially before the planetary speed reduction gear set 870 which reduces vehicle travel before the gear set is engaged.

Figure 13:
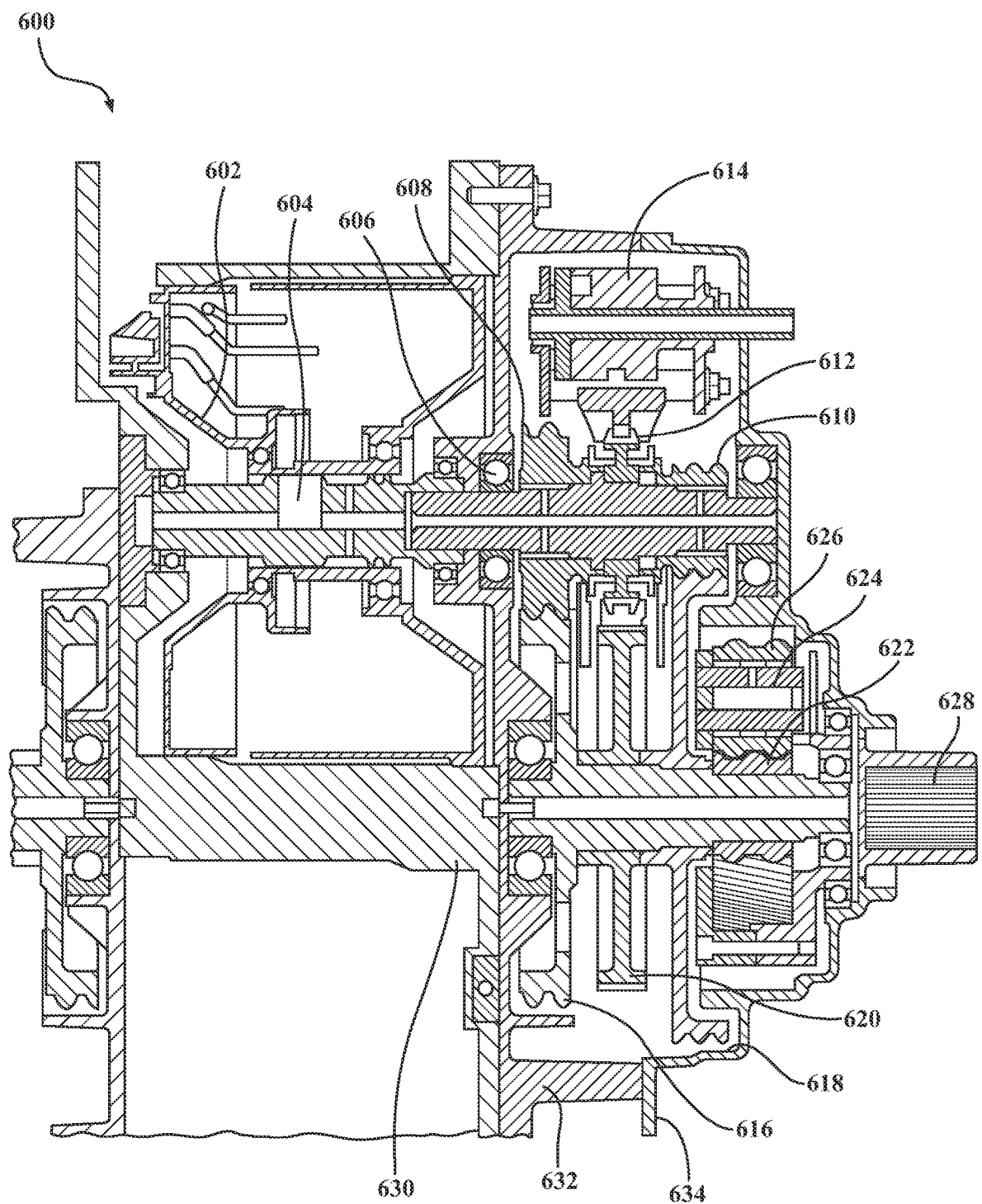
FIG. 13 is a cross sectional view of the transmission of FIG. 10 in neutral position.
Figure 14:
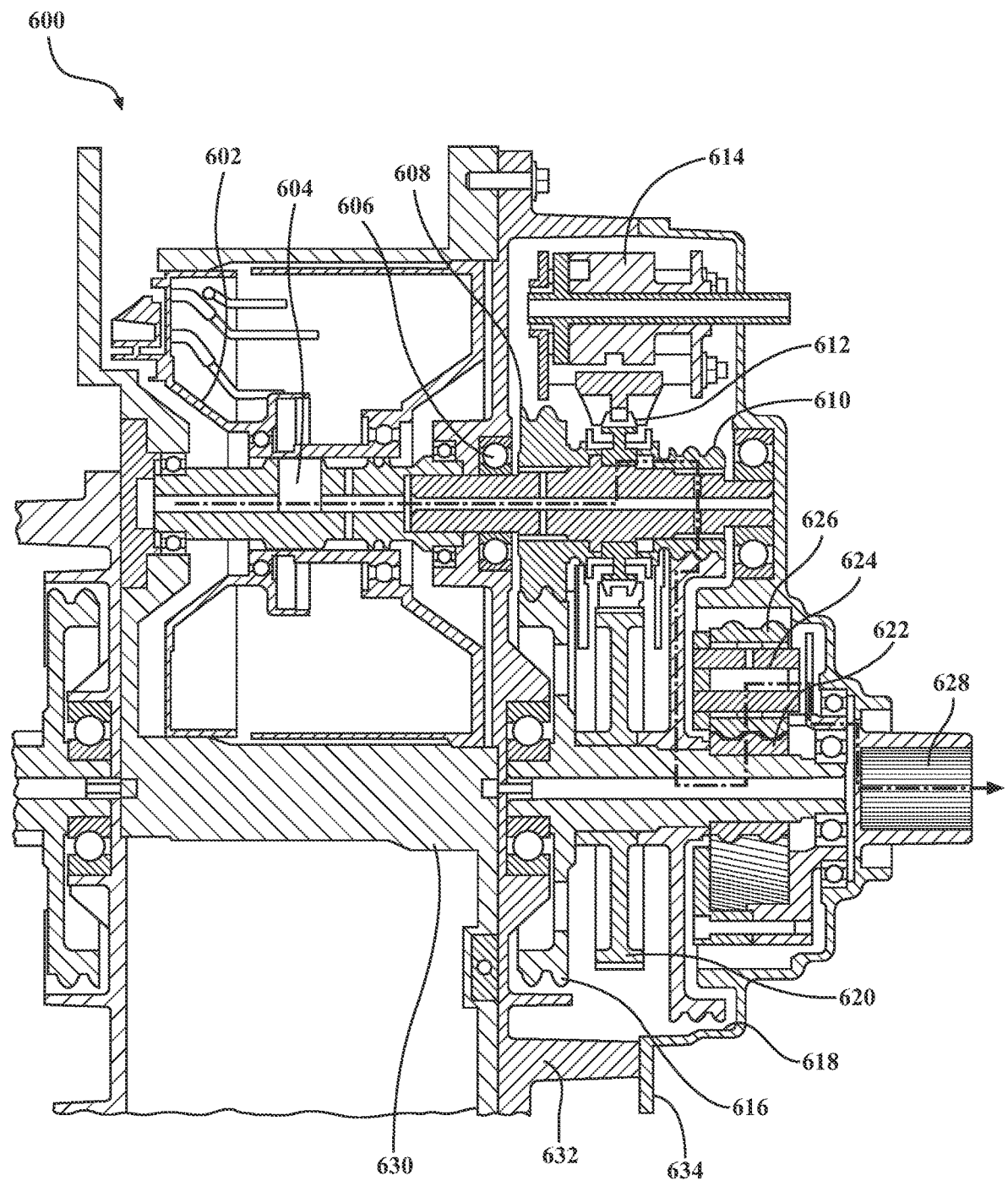
FIG. 14 is a cross sectional view of the transmission of FIG. 13 showing power flow in a low gear state.

Referring to FIG. 13, the transmission 600 (in a neutral state) comprises an electric drive motor 602 splined to a motor shaft 604 and which is in turn splined to an input shaft 606. The input shaft is splined to a hub of the synchronizer 612. The synchronizer 612 sits on a slide shift collar (not shown) that connects to either the low or high shift pinion gear 608 or 610 of the helical gear sets when the synchronizer 612 is shifted by means of gear shift system 614. The plurality of pinion gears 608 and 610 when connected to synchronizer 612 transfer power from the pinion gear 608 or 610 to wheel gears 616 or 618 through a planetary pinion gear configuration. Synchronizer 612 can be connected by means of gear shift mechanism 614 to either the low gear pinion 610 or the high gear pinion 608 depending on the ratio desired. Additional components of the gearbox assembly may include one or more gearbox housings 632 or covers 634 for protecting the components of the transmission or for fixing or grounding one or more of the gears of the transmission by splining them to the housing 632 or cover 634. Electric drive motor 602 may also include a motor housing 630 to protect the motor components.

In a low gear state (FIG. 14) (about 17.9 ratio), power is generated in the motor 1 and is transferred through the motor shaft 604 to the input shaft 606 via a spline interface (not shown). The power is then carried by a spline (not shown) from input shaft 606 to synchronizer 612. In low gear (about 17.9 ratio), synchronizer 612 is connected to the low range pinion gear 610 which transfers power from motor 602 through gear teeth 860 (such as those shown in FIG. 11) to the low range wheel gear 618. Low range wheel gear 618 is splined to the sun gear 622 of the planetary gear assembly which utilizes a plurality of planetary pinion gears 624 and a fixed or grounded planetary ring gear 626 to transfer power to planetary carrier 628 by rotating the sun gear 622. The rotation of the sun gear 622 is captured through the pins (not shown) of the planetary pinion gear 624 which are held by planetary carrier 628 and through which transmission power is output.

Figure 15:
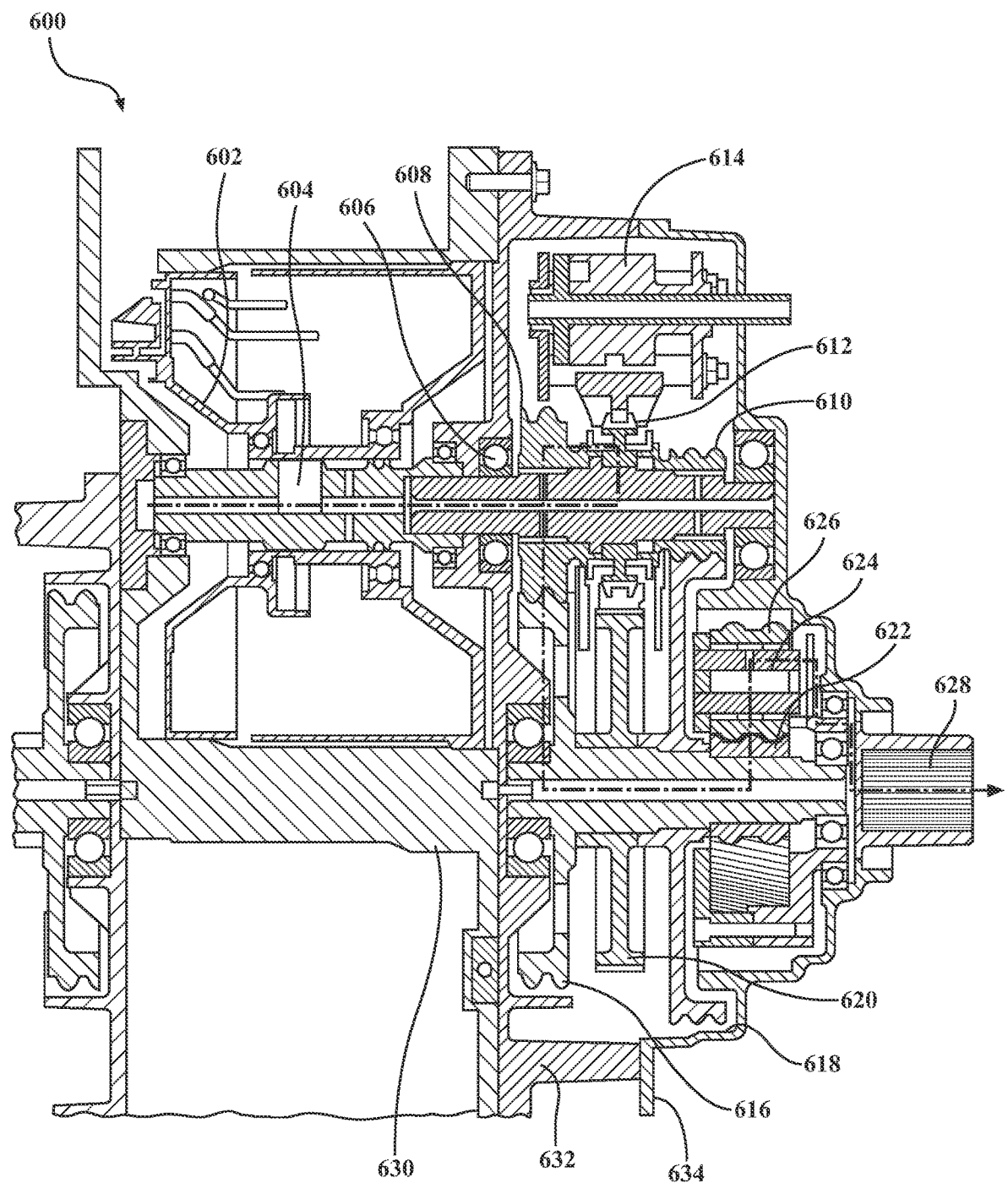
FIG. 15 is a cross sectional view of the transmission of FIG. 13 showing power flow in a high gear state.

In high gear state (8.8 ratio) shown in FIG. 15, synchronizer 612 is connected to the high range pinion gear 608 which then transfers the power through gear teeth 860 (such as those shown in FIG. 11) to high range wheel gear 616. High range wheel gear 616 is splined to sun gear 622 which utilizes a plurality of planetary pinion gears 624 and a fixed or grounded planetary ring gear 626 to transfer power to the planetary carrier 628. Wheel gear 616 is a one piece gear with a layshaft (not shown) to which wheel gear 618 and park gear wheel 620 are splined. Park gear wheel 620 does not transmit power to the transmission, but is used to prevent motion of a vehicle when the park lock system 700 is engaged. In this embodiment, wheel gears 616 and 618 are comparatively larger than planetary pinion gear 624. This allows ring gear 626 to be disposed within wheel gears 616 and 618 thus reducing the axial space required for the transmission 600 and gearbox assembly 500 incorporating the transmission 600.

In some embodiments (not shown), the gearbox assembly 500 may be integrated into a drive train which may incorporate a first and second gearbox assembly and may also include two speed transmissions of the type described herein. The drive train may further include a centre motor housing which houses two separate motors of the type that may drive power into a transmission, two speed transmissions of the type described herein placed on either side of the centre motor housing, and an inverter for powering the drive motor. In operation, power may be driven through the motors into the transmissions and then through an output for each transmission to an axle shaft for controlling a wheel or wheel shaft such as for example wheels 12 or 14.

Each transmission is configured to be operated independently. This allows greater flexibility in controlling the wheels to which the transmissions are attached. In operation, it may therefore be possible to control the torque and speed of each wheel independently (torque vectoring), thus allowing greater maneuverability of the vehicle.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described. The subject matter described herein and in the recited claims intends to cover and embrace all suitable changes in technology.

The invention claimed is:

1. A multi speed transmission comprising:
   a transmission input;
   a transmission output;
   a primary reduction gear set comprising a first sun gear configured as the transmission input, a first ring gear directly attached to ground, a first planetary carrier with a plurality of interconnected pinion gears meshing with the first sun gear and first ring gear;
   a gear assembly comprising a step pinion planetary gear set having second and third sun gears, a second ring gear directly attached to ground, a second planetary carrier configured as the transmission output with a plurality of interconnected pinions meshing with the second and third sun gears and second ring gear; and
   first and second input clutches driveably connected to the transmission input;
   wherein the first sun gear configured as the transmission input and the second planetary carrier configured as the transmission output are spaced mutually along the same longitudinal axis.

2. The transmission of claim 1 further comprising a synchronizing clutch assembly operably connected to the first and second input clutches and configured to transfer power from the first input clutch to the second input clutch by means of an engagement hub operably connected to the first and second input clutch.

3. The transmission of claim 2 wherein the transmission is configured to selectively shift between a high gear ratio and a low gear ratio by the clutch assembly selectively engaging with an engagement ring of one of the second or third sun gears.

4. The transmission of claim 3 wherein the low gear ratio is about 14:1 and the high gear ratio is 4.66:1.

5. The transmission of any one of claims 2 to 4 wherein in a longitudinal axis about the transmission, primary reduction gear set is disposed wholly to the side of the synchronizing clutch assembly closer to the transmission input.

6. The transmission of claim 1 wherein the transmission is operable between a neutral state wherein the transmission input is uncoupled from the transmission output and an active state wherein the transmission input is operatively coupled to the transmission output.

7. A gearbox assembly comprising the transmission of claim 1 to 6.

8. A vehicle comprising the gearbox assembly of claim 7.

* * * * *